United States Patent
Krishnan

(10) Patent No.: US 10,019,137 B2
(45) Date of Patent: Jul. 10, 2018

(54) ELECTRONIC DOCUMENT DISPLAY

(75) Inventor: Kulathumani Krishnan, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1196 days.

(21) Appl. No.: 13/467,286

(22) Filed: May 9, 2012

(65) Prior Publication Data

US 2013/0300768 A1    Nov. 14, 2013

(51) Int. Cl.
- *G06F 3/14* (2006.01)
- *G06F 3/0483* (2013.01)
- *G06F 17/21* (2006.01)
- *G06F 3/0488* (2013.01)
- *G06F 3/048* (2013.01)

(52) U.S. Cl.
CPC ........ *G06F 3/0483* (2013.01); *G06F 3/04886* (2013.01); *G06F 17/211* (2013.01); *G06F 2203/04803* (2013.01)

(58) Field of Classification Search
CPC . G06F 3/14; G06F 17/24; G06F 17/30; G06F 3/0483; G06F 17/211; G06F 2203/04803; G06F 3/04886
USPC .......................................... 715/256, 273, 776
See application file for complete search history.

(56) References Cited

U.S. PATENT DOCUMENTS

| | | | |
|---|---|---|---|
| 5,943,679 A | 8/1999 | Niles et al. | |
| 6,486,895 B1 | 11/2002 | Robertson et al. | |
| 7,219,089 B2 * | 5/2007 | Kobayashi et al. | |
| 8,043,152 B2 * | 10/2011 | Walker et al. | ........... 463/16 |
| 8,112,712 B2 * | 2/2012 | Matsumoto | ........... 715/732 |
| 2002/0113823 A1 | 8/2002 | Card et al. | |
| 2002/0118230 A1 * | 8/2002 | Card et al. | ........... 345/776 |

(Continued)

FOREIGN PATENT DOCUMENTS

| | | |
|---|---|---|
| CN | 1241150 C | 2/2006 |
| CN | 1875338 A | 12/2006 |
| EP | 2284679 A2 | 2/2011 |

OTHER PUBLICATIONS

International Search Report and Written Opinion—PCT/US2013/040439, International Search Authority—European Patent Office, dated Dec. 18, 2013.

(Continued)

*Primary Examiner* — Cesar Paula
*Assistant Examiner* — Jian Huang
(74) *Attorney, Agent, or Firm* — Patterson & Sheridan, L.L.P.

(57) ABSTRACT

Methods, systems, devices, are described for displaying a document. In one view, a first substantially rectangular shape containing a current page of the document may be displayed adjacent to a second substantially rectangular shape containing a number of pages other than the current page. A rotational motion input may be received at the device, and the first and second shapes may be updated based on a new current page identified by the rotational motion input. In another view, a number of curved shapes may be displayed in a nested arrangement defined by a spiral, each of the curved shapes being associated with a portion of the document. A current page may be stored, and a rotational motion input may be received. The current page may be updated according to at least an end point of the received rotational motion input.

47 Claims, 16 Drawing Sheets

(56) References Cited

U.S. PATENT DOCUMENTS

| | | | |
|---|---|---|---|
| 2005/0054423 A1* | 3/2005 | Wadleigh | 463/20 |
| 2007/0120856 A1* | 5/2007 | De Ruyter et al. | 345/440 |
| 2008/0062141 A1 | 3/2008 | Chandhri | |
| 2008/0084400 A1* | 4/2008 | Rosenberg | G06F 1/1626 345/173 |
| 2008/0256440 A1* | 10/2008 | Boreham | G06F 17/211 715/247 |
| 2009/0262074 A1* | 10/2009 | Nasiri et al. | 345/158 |
| 2010/0005418 A1 | 1/2010 | Miyazaki et al. | |
| 2010/0097337 A1 | 4/2010 | Lin et al. | |
| 2010/0146376 A1* | 6/2010 | Reams | G06Q 30/02 715/208 |
| 2010/0325573 A1 | 12/2010 | Estrada et al. | |
| 2011/0055774 A1 | 3/2011 | Kim et al. | |
| 2013/0055140 A1* | 2/2013 | Mosquera | G06F 3/0483 715/776 |
| 2013/0219269 A1* | 8/2013 | Cranfill et al. | 715/256 |

OTHER PUBLICATIONS

Padova T., "Adobe Acrobat 8 PDF Bible", Feb. 7, 2007 (Feb. 7, 2007), Wiley Publishing Inc, Indianapolis, Indiana, XP002710059, ISBN: 9780470050514 p. 109 p. 446-p. 448.
Partial International Search Report—PCT/US2013/040439—ISA/EPO—dated Aug. 19, 2013.

* cited by examiner

ELECTRONIC DOCUMENT DISPLAY

BACKGROUND

The following relates generally to electronic documents, and more specifically to the rendering and display of electronic documents for viewing on a device. Modern electronic devices are capable of storing a large amount of data in a small amount of space. Because of their size and portability, large numbers of consumers are using electronic devices to view content traditionally published on physical media such as books, newspapers, and magazines. Examples of devices used to store and display electronic documents include smartphones, tablet devices, e-readers, laptop computers, and the like.

However, the display of documents on electronic devices is not without challenges. Many devices used to display electronic documents have relatively small display areas. For example, some smartphones and e-readers have screens that are smaller than an average page from a book or magazine. Thus, efficient use of screen real estate may be a significant driving factor in how pages from documents are displayed on an electronic device. Additionally, navigating through a document on an electronic device can be less intuitive than navigating through the same document published on printed media. For instance, when reading a book, a reader may use her fingers to quickly flip back and forth between two sections of the book. However, electronic devices do not typically provide a digital analog to this type of navigation.

SUMMARY

The described features generally relate to one or more improved systems, methods, and/or apparatuses for displaying a document. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

In a first set of embodiments, a method of displaying a document on a device may include displaying a first substantially rectangular shape including a current page of the document; displaying a second substantially rectangular shape substantially adjacent to the first substantially rectangular shape, the second substantially rectangular shape including a plurality of pages other than the current page; receiving a rotational motion input at the device; displaying a new current page in the first substantially rectangular shape responsive to the rotational motion input, and updating the second substantially rectangular shape based on the new current page in the document identified by the rotational motion input. In certain examples, the second substantially rectangular shape may share a side with the first substantially rectangular shape. The first substantially rectangular shape may, in some examples, be a square, and the second substantially rectangular shape may be a rectangle having a length-to-width ration substantially equal to $\varphi$ (i.e., a golden rectangle).

The second substantially rectangular shape may include, for example, a third substantially rectangular shape having a page immediately previous to the current page. The second substantially rectangular shape may further include a fourth substantially rectangular shape adjacent to the third substantially rectangular shape, the fourth substantially rectangular shape sharing a side with the third substantially rectangular shape and comprising a plurality of pages prior to the page displayed in the third substantially rectangular shape. In certain examples, each of the pages in the second substantially rectangular shape is displayed at a size proportional to a distance of that page from the current page in the document. The second substantially rectangular shape may, in certain examples, include at least one page of the document selected by the user for bookmarking. In certain examples, the method may include receiving a selection of one of the pages other than the current page and updating the current page based on the selected page.

The rotational motion input may be received, for example, at a touchscreen display configured to display the first and second substantially rectangular shapes. The current page may be updated in real-time as the rotational motion input is received to navigate the pages in the document based on the received rotational motion input. In certain examples, the direction of the navigation may be controlled based on a direction of the received rotational input.

In certain examples, the method may further include receiving a request to display a chapter view of the document; displaying a number of curved shapes arranged according to a spiral, each of the curved shapes representing a portion of the document; receiving a second rotational motion input; and based on an end point of the received second rotational motion input and the displayed representation of the different chapters of the document, updating the current page of the document. In certain examples, the spiral may be a logarithmic spiral having a growth factor substantially equal to $\varphi$ (i.e., a golden spiral). The method may further include allowing a user to navigate through a magnified representation of a selected chapter and updating the current page based on a page selected by the user from the magnified representation of the selected chapter.

In a second set of embodiments, a system of displaying a document on a device may include an interface module, an input module, and a current page module. The interface module may be configured to display a first substantially rectangular shape including a current page of the document and a second substantially rectangular shape substantially adjacent to the first substantially rectangular shape, the second substantially rectangular shape including a plurality of pages other than the current page. The input module may be configured to receive a rotational motion input at the device. The current page module may be configured to display a new current page in the first substantially rectangular shape responsive to the rotational motion input and update the second substantially rectangular shape based on the new current page in the document identified by the rotational motion input.

In a third set of embodiments, a system of displaying a document on a device may include means for displaying a first substantially rectangular shape including a current page of the document; means for displaying a second substantially rectangular shape substantially adjacent to the first substantially rectangular shape, the second substantially rectangular shape including a plurality of pages other than the current page; means for receiving a rotational motion input at the device; means for displaying a new current page in the first substantially rectangular shape responsive to the rotational motion input; and means for updating the first substantially rectangular shape and the second substantially rectangular shape based on a new current page in the document identified by the rotational motion input.

In a fourth set of embodiments, a computer program product configured to display a document on a device may include a non-transitory computer-readable medium. The medium may include code to display a first substantially rectangular shape including a current page of the document; code to display a second substantially rectangular shape substantially adjacent to the first substantially rectangular shape, the second substantially rectangular shape including a plurality of pages other than the current page; code to receive a rotational motion input at the device; code to display a new current page in the first substantially rectangular shape responsive to the rotational motion input; and code to update the first substantially rectangular shape and the second substantially rectangular shape based on a new current page in the document identified by the rotational motion input.

In a fifth set of embodiments, a method of displaying a document on a device includes displaying a plurality of curved shapes in a nested arrangement defined by a spiral, each of the curved shapes associated with a portion of the document; storing a current page of the document; receiving a rotational motion input at the device; navigating to a selected page in the document based on at least an endpoint of the rotational motion input; and updating the current page of the document to the selected page.

In certain examples, the spiral may be a logarithmic spiral with a growth factor substantially equal to $\varphi$ (i.e., a golden spiral).

In certain examples, the method may further include displaying an indication of the current page over a curved shape of the plurality of curved shapes associated with the current page. The curved shape associated with the current page may be magnified. A preview of the current page may be displayed. In certain examples, the method may also include continuously updating the current page based on the rotational motion input as the rotational motion input is received.

In certain examples, the method may further include receiving a request to switch to a page view of the document, displaying a first substantially rectangular shape including the current page of the document, and displaying a second substantially rectangular shape substantially adjacent to the first substantially rectangular shape. The second substantially rectangular shape may include a plurality of pages other than the current page. The first substantially rectangular shape may be a square, and the second substantially rectangular shape may be a rectangle with a length-to-width ration substantially equal to $\varphi$ (i.e., a golden rectangle). In certain examples, the method may further include receiving a second rotational motion input at the device, updating the current page of the document based on the second rotational motion input, and updating the first substantially rectangular shape and the second substantially rectangular shape based on the updated current page.

In a sixth set of embodiments, a system of displaying a document on a device may include an interface module, an input module, and a current page module. The interface module may be configured to display a plurality of curved shapes in a nested arrangement defined by a spiral, each of the curved shapes associated with a portion of the document. The input module may be configured to receive a rotational motion input at the device. The current page module may be configured to store a current page of the document, navigate to a selected page in the document based on at least an end point of the rotational motion input, and update the current page of the document to the selected page.

In a seventh set of embodiments, a system of displaying a document on a device may include means for displaying a plurality of curved shapes in a nested arrangement defined by a spiral, each of the curved shapes associated with a portion of the document; means for storing a current page of the document; means for receiving a rotational motion input; means for navigating to a selected page in the document based on at least an end point of the rotational motion input; and means for updating the current page of the document to the selected page.

In an eighth set of embodiments, a computer program product configured to display a document on a device may include a non-transitory computer-readable medium. The medium may include code to display a plurality of curved shapes in a nested arrangement defined by a spiral, each of the curved shapes associated with a portion of the document; code to store a current page of the document; code to receive a rotational motion input; code to navigate to a selected page in the document based on at least an end point of the rotational motion input; and code to update the current page of the document to the selected page.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure describes systems, devices, methods, and computer program products for displaying electronic documents using an intuitive and functionally aesthetic navigation interface. In one example, a first rectangle containing a current page of the document is displayed adjacent to a second rectangle containing a number of pages of the document other than the current page. The first and second rectangles may share a side. A rotational motion input may be received from a user, and the first rectangle and the second rectangle may be updated based on a new current page in the document identified by the rotational motion input. In some examples, a user may toggle between the above described page mode and a chapter mode, in which representations of various sections of the document are arranged within a logarithmic spiral.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
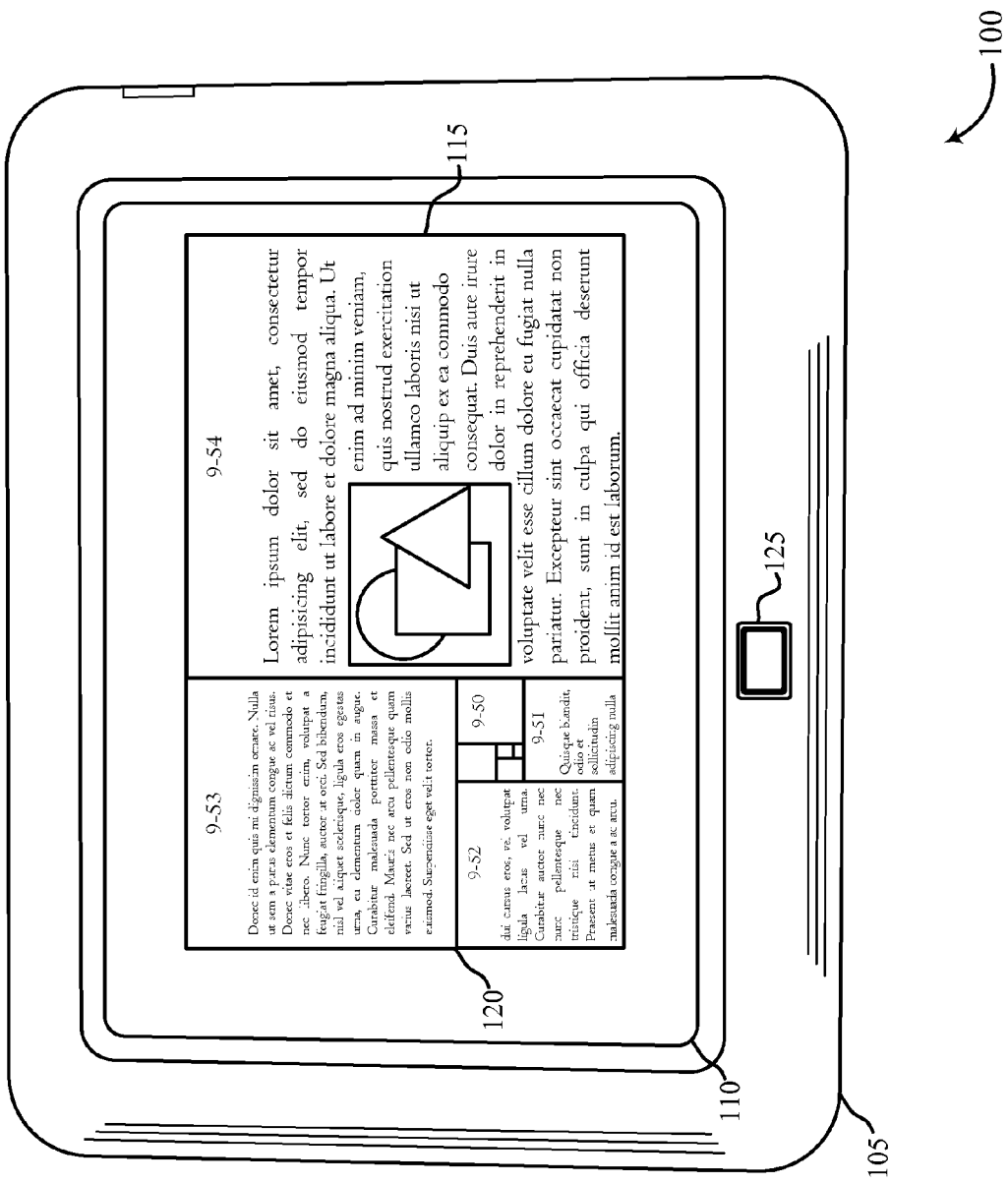
FIG. 1 shows a diagram of an example display of an electronic document, according to various embodiments of the invention.

Referring now to the Figures, FIG. 1 is a diagram 100 of an example mobile device 105 is shown displaying an electronic document. The mobile device 105 may be, for example, a tablet computer or a smartphone. The mobile device 105 includes a display 110 configured to display pages from the electronic document. The display 110 may include a microelectromechanical system (MEMS)-based display, such as a MIRASOL display available from QUALCOMM, INC. In other examples, the display 110 may include a light-emitting diode (LED) display, a liquid crystal display (LCD), or any other display that may suit a particular application of the principles described herein. In certain examples, the display 110 may include a touchscreen that displays content and receives touch input at the same two-dimensional surface.

The page view of FIG. 1 includes a prominent display of a current page (9-54) and less prominent display of pages prior to the current page. For example, the device may display a first rectangle 115 containing the current page, and a second rectangle 120 adjacent to the first rectangle, the second rectangle containing a number of pages previous to the current page. The perimeter of the second rectangle 120 in the current view may be defined by the shapes of pages 9-53, 9-52, 9-51, and 9-50. In the present example, the second rectangle 120 shares a side with the first rectangle 115. Pages in the electronic document may include text, images, or other content.

Each of the pages inside of the second rectangle 120 may be displayed within its own rectangle at a size that is proportionate to the distance of that page from the current page in the document. For example, in FIG. 1, the rectangle containing page 9-54 is larger than the rectangle containing page 9-53, which is larger than the rectangle containing page 9-52, which is larger than the rectangle containing page 9-51, and so forth.

The page display of FIG. 1 may be recursive in nature. For instance, the first rectangle 115 contains the current page 9-54, and adjacent to the first rectangle is the second rectangle 120 containing a number of pages prior to the current page. Within the second rectangle 120 is a third rectangle containing page 9-53, and adjacent to the third rectangle is a fourth rectangle containing a number of pages prior to page 9-53. Within the fourth rectangle is a fifth rectangle containing page 9-52, and adjacent to the fifth rectangle is a sixth rectangle containing a number of pages prior to page 9-52.

In the example of FIG. 1, the recursive page display is enabled through the use of squares and golden rectangles. A golden rectangle is defined a rectangle having a length-to-width ratio substantially equal to $\varphi$, also known as the golden ratio, which has an approximate value of 1.61803399. In the example of FIG. 1, Each rectangle containing a single page, including the first rectangle 115, is a square. Each rectangle containing multiple pages, including the second rectangle 120, is a golden rectangle. The geometric properties of golden rectangles allow for a recursive spiral arrangement of squares for the simultaneously displayed pages.

While the second rectangle 120 in the example of FIG. 1 contains pages that immediately precede the current page displayed in the first rectangle 115, in other examples the granularity of the displayed pages may be different. For example, the second rectangle 120 may display pages in steps of 5 from the current page (i.e., a page that is five pages before the current page, a page that is 10 pages before the current page, a page that is 15 pages before the current page, etc.). In certain examples, the granularity may increase or decrease with each page displayed. Thus, the second rectangle 120 may show the three pages immediately prior to the current page, a page that is 10 pages prior to the current page, and a page that is 20 pages prior to the current page. In additional or alternative examples, the second rectangle 120 may display one or more pages that follow the current page.

A user may navigate the electronic document by providing tactile touchscreen input to the display 110 or input from one or more physical controls 125. Based on the input from the touchscreen or physical controls 125, a new current page of the document may be selected and the contents of the displayed rectangles 115, 120 may change accordingly. In certain examples, the geometric characteristics of the layout shown in FIG. 1 may be particularly amenable to input provided as a circular motion of the finger. The direction of navigation may be determined by the direction of rotation (i.e. clockwise or counterclockwise).

The display 110 may continuously update as the motion is made, thereby allowing the user to view the navigation through the pages in real-time. In some examples, the speed and granularity of navigation through the pages may increase or decrease based on the length of time the motion is made and the current distance from the page at which navigation began. Using this method of navigation, the user may glance back and forth between multiple pages of multiple chapters without the distraction or delay associated with other navigation systems.

Additionally, the user may quickly navigate to any of the pages shown in the second rectangle 120 by simply selecting that particular page in the display. For example, the user may tap on touchscreen display 110 over the selected page in the second rectangle 120. Alternatively, the user may manipulate the one or more physical controls 125 to identify and select a page from those displayed in the second rectangle 120 The selected page in the second rectangle 120 may then be set as the current page, and the first and second rectangles 115, 120 may be updated accordingly.

Figure 2A:
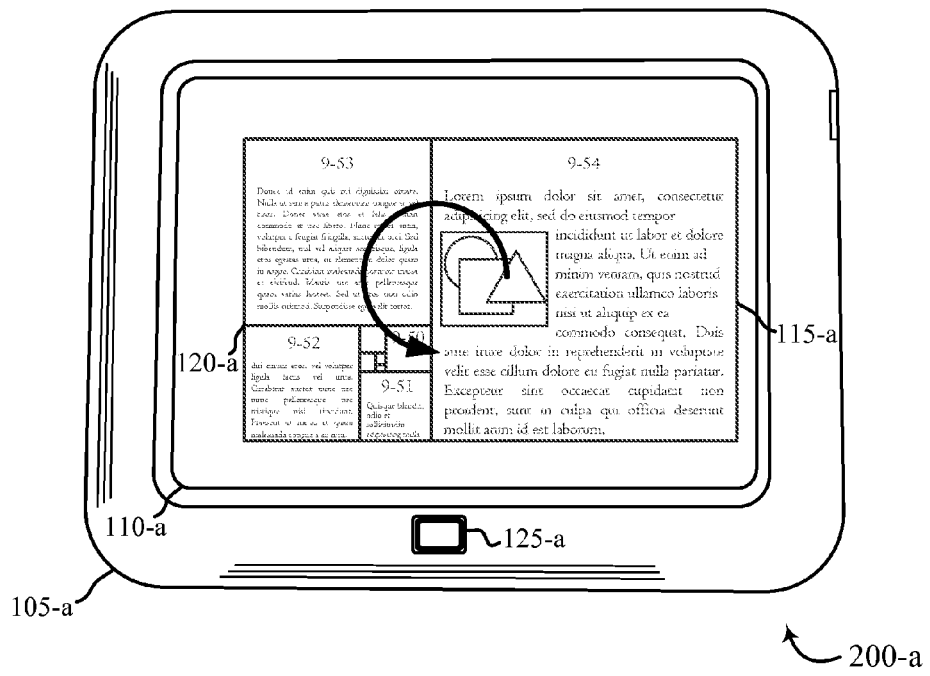
FIGS. 2A and 2B show diagrams of an example display of an electronic document at different points in time, according to various embodiments of the invention.
Figure 2B:
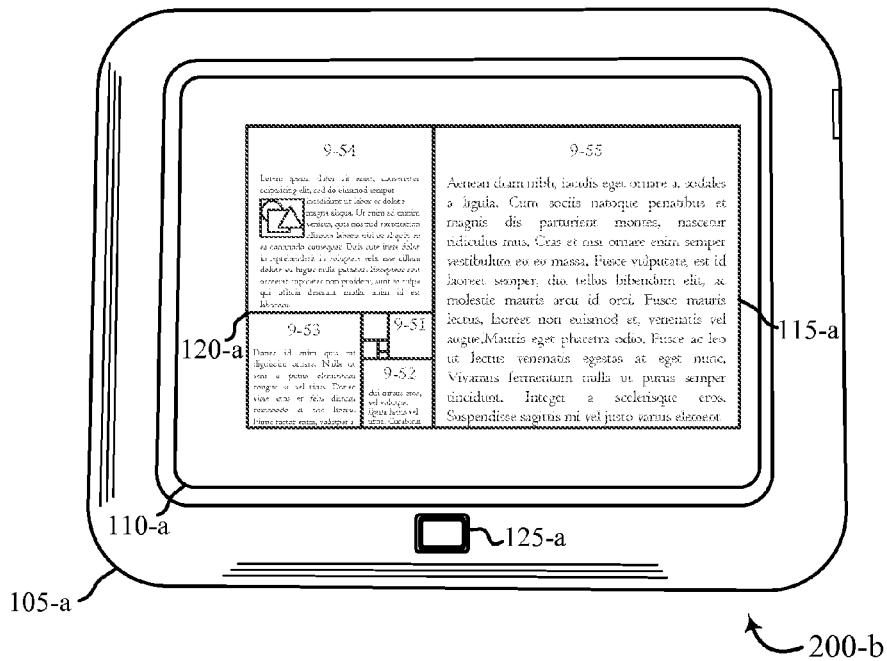

FIG. 2A and FIG. 2B are diagrams 200 showing an example mobile device 105-a at different points during an operation for navigating through the electronic document. The mobile device 105-a may be an example of the mobile device 105 described above with reference to FIG. 1. At FIG. 2A, the current page displayed in the first rectangle 115-a is 9-54, and the second rectangle displays representations of the four pages (9-53, 9-52, 9-51, and 9-50) immediately preceding the current page at sizes proportional to their relative distances from the current page. A rotational input is received from the user in the form of a circular motion on the touchscreen display 110-a, as indicated by the arrow in FIG. 2A.

Based on the endpoint, speed, direction, and/or duration of the rotational input, the mobile device 105-a may select a new current page of the electronic document and update the first and second rectangles 115-a, 120-a of the display 110-a to reflect the new current page. In the example of FIG. 2B, the rotational input provided to the touchscreen display 110-a advances the position in the electronic document by one page such that page 9-55 is now the current page. Accordingly, the first rectangle 115-a now displays page 9-55, and the second rectangle 120-a now displays pages 9-54, 9-53, 9-52, and 9-51, which immediately precede the new current page.

Figure 3:
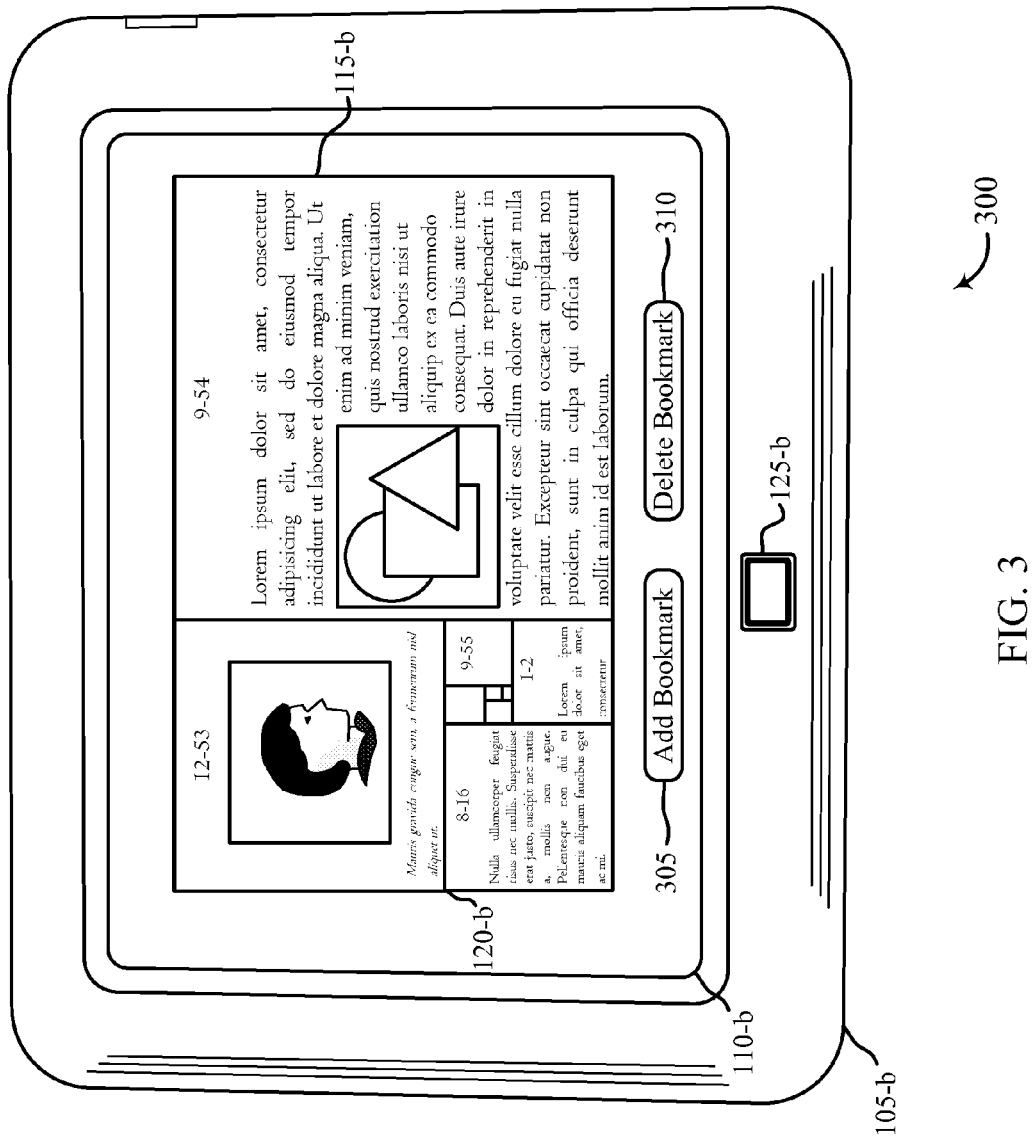
FIG. 3 shows a diagram of an example display of a portion of an electronic document, according to various embodiments of the invention.

FIG. 3 is a diagram 300 showing a mobile device 105-b for displaying an electronic document. The mobile device 105-b may be an example of the mobile devices 105 described above with reference to FIG. 1, FIG. 2A or FIG. 2B. As with the previous examples, the display 110-b of the mobile device 105-b in the present example may show a first rectangle 115-b and a second rectangle 120-b. The first rectangle 115-b may be a square, and the second rectangle 120-b may be a golden rectangle sharing a side with the first rectangle 115-b.

The first rectangle 115-b of the mobile device 105-b may show the current page (i.e. page 9-54). However, unlike the examples described above, the second rectangle 120-b of the present example may contain a number of pages from different locations of the electronic document, both before and after the current page. The pages shown in the second rectangle 120-b may include pages that the user has previously bookmarked while browsing the electronic document. The size of each bookmarked page may be based on the chronological order in which the bookmarks were created, the distance of the bookmarked pages from the current page, a user preference, or any other applicable criterion.

The user may navigate to a bookmarked page displayed in the second rectangle 120-b by tapping over that page on the display 110-b or by manipulating the physical control 125-b to identify and select the desired bookmarked page. The user may also navigate through the document by providing input through the display 110-b or the physical control 125-b to advance or regress the current page in the document as described above with respect to previous examples. In certain examples, as the first rectangle 115-b is updated during navigation to reflect a changing current page, the bookmarked pages shown in the second rectangle 120-b may remain static.

In addition, the display 110-b may provide controls for adding pages in the electronic document to the bookmarks displayed in the second rectangle 120-b. In the example of FIG. 3, these controls may include an add bookmark button 305 and a delete bookmark button 310. For instance, when a user taps or otherwise selects the add bookmark button 305, the current page may be added to the bookmarked pages shown in the second rectangle 120-b. Similarly, when the delete bookmark button 310 is selected, the current page may be removed from the bookmarked pages shown in the second rectangle 120-b.

In certain examples, a drag-and-drop functionality may be used to manage the bookmarked pages. For instance, the current page may be added to the bookmarks displayed in the second rectangle 120-b by dragging the current page over to the second rectangle 120-b and dropping the current page onto the second rectangle 120-b. Additionally or alternatively, a bookmarked page may be removed from the bookmarks of the second rectangle 120-b by dragging that page to a designated area of the display (e.g., a trash can icon or the delete bookmark button 310).

Figure 4:
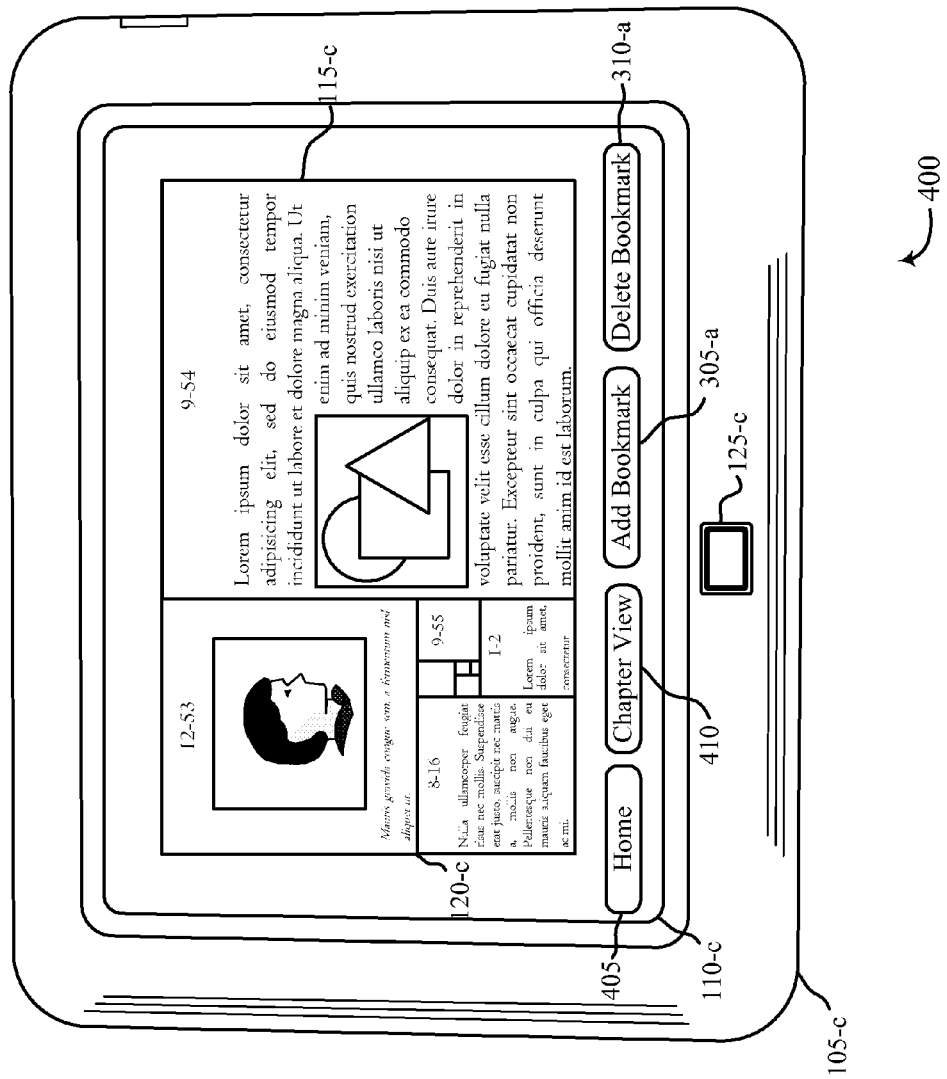
FIG. 4 shows a diagram of an example display of a portion of an electronic document, according to various embodiments of the invention.

FIG. 4 is a diagram 400 showing a mobile device 105-c for displaying an electronic document. The mobile device 105-c may be an example of the mobile devices 105 described above with reference to FIG. 1, FIGS. 2A-2B, or FIG. 3. As with the previous examples, the display 110-c of the mobile device 105-c in the present example may show a first rectangle 115-c and a second rectangle 120-c. The first rectangle 115-c may be a square, and the second rectangle 120-c may be a golden rectangle sharing a side with the first rectangle 115-c. The second rectangle 120-c may contain a number of bookmarked pages (e.g., pages 12-53, 8-16, 1-2, and 9-55) from the electronic document. The display 110-c may also include buttons 305-a, 310-a for managing the bookmarked pages displayed in the second rectangle 120-c, as described above with reference to the example of FIG. 3.

Additionally, the display 110-c may show a home button 405 for returning to a home menu for the mobile device 105-c. The home menu may allow a user to select a different electronic document to view or execute an application separate for another purpose. The chapter view button 410 may allow the user to toggle from a page view, as shown in FIGS. 1-4, to a chapter view in which the user is able to view a representation of the entire electronic document and navigate to a new current page based on that representation. Examples of such chapter views are given in FIGS. 5A-5B and FIGS. 6A-6B.

Figure 5A:
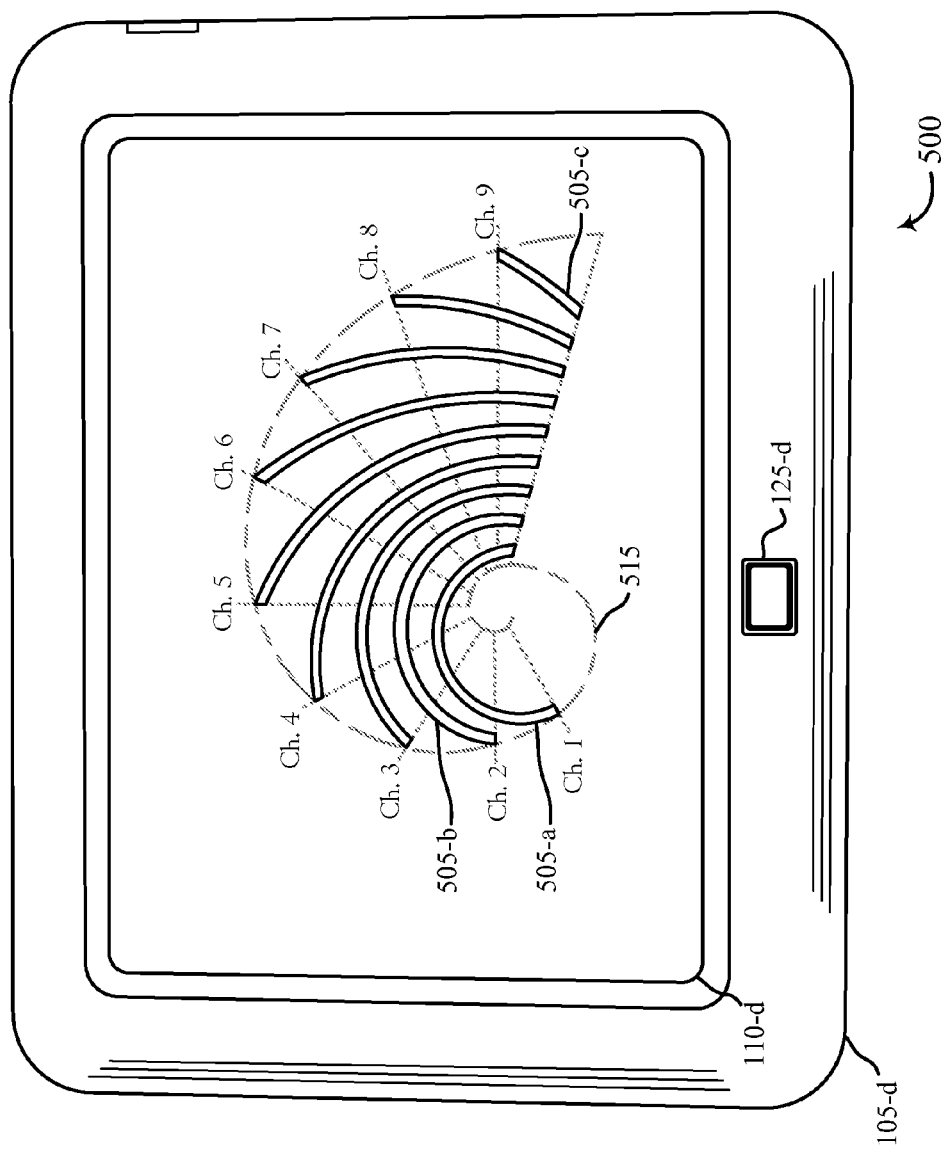
FIGS. 5A and 5B show diagrams of different viewing modes of an example display of an electronic document, according to various embodiments of the invention.
Figure 5B:
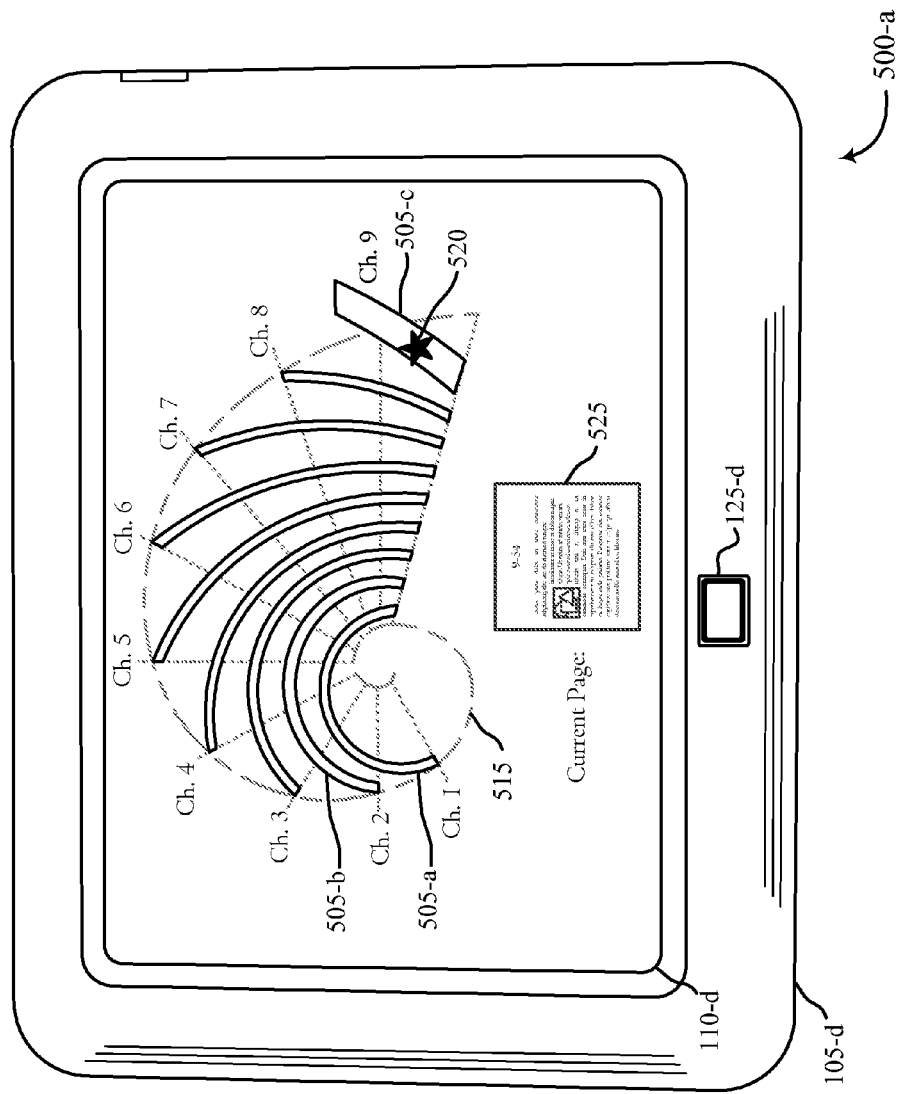

FIGS. 5A and 5B are diagrams 500 of an example mobile device 105-d with a display 110-d showing example an example chapter view of an electronic document at different points in time. The mobile device 105-d of the present example may be an example of the mobile devices 105 described above with reference to FIG. 1, FIGS. 2A-2B, FIG. 3, and FIG. 4.

In the example of FIGS. 5A and 5B, the chapter view includes a display of multiple curved shapes 505 in a nested arrangement that is defined by a spiral 515. In certain examples, the spiral 515 may be a golden spiral, defined as a logarithmic spiral with a growth factor substantially equal to $\varphi$. Each of the curved shapes 505 may represent a particular portion (i.e. a chapter) of the electronic document.

As shown in FIGS. 5A and 5B, each curved shape 505 may be arranged such that it is bowed outward toward an enclosing portion of the spiral 515. Invisible or real rays may extend outward at different angles from a central point of the spiral 515 such that each curved shape 505 begins at the intersection of one of the rays and spiral 515. Additionally, each of the curved shapes 505 may end at the point where that curved shape 505 intersects with a ray defining the end point for all of the curved shapes 505.

Because each of the curved shapes 505 represent a chapter in the electronic document, a user may quickly navigate to a particular portion of the document by selecting (e.g., via touchscreen display 110-d or physical control 125-d) a curved shape 505 associated with a desired chapter and tracing the user's finger along that curved shape 505 until a desired portion of the chapter has been reached. At that point, the user may lift the user's finger to select that portion of the chapter, and the current page of the electronic document may be updated to the page corresponding to the point at which the user's finger was lifted. Once the current page has been updated, the display 110-d may revert to a page view, such as the examples shown in FIGS. 1-4.

FIG. 5B shows one example of navigating to a particular point of an electronic document using the chapter view of the present example. In this example, a user has selected curved shape 505-c, corresponding to Chapter 9 of the electronic document. Consequently, curved shape 505-c has been temporarily magnified, and an indicator 520 of a current selected point in the electronic document is displayed. The indicator 520 may track the position of the user's finger on the touchscreen display 110-d. Additionally, a preview 525 is provided of the current page corresponding to the currently selected point in the electronic document. The preview may show a scaled down view of the current page in its entirety. In alternate examples, the preview may show a larger view of a portion of the text or images on the current page.

As the user's finger moves along the curved shape 505-c corresponding to Chapter 9, the current page may be automatically updated based on the rotational input received from the user's finger. Coinciding with the dynamic updating of the current page, the indicator 520 may move and the preview 525 may be updated to reflect the current page. Once the user has selected the page to which the user desires to navigate, the user's finger may be removed from the touchscreen display 110-d. At this point, the display 110-d may revert to a page view, such as the page views shown in FIGS. 1-4. In additional or alternate examples, the user may select the curved shape 505-c corresponding to Chapter 9, navigate along the curved shape 505-c to a desired page, and select the desired page as the new current page using a physical control 125-d. In certain examples, after selecting a page in this manner, the user may be prompted with a choice to either open the page view of the selected current page or continue navigating to select a new current page.

Figure 6A:
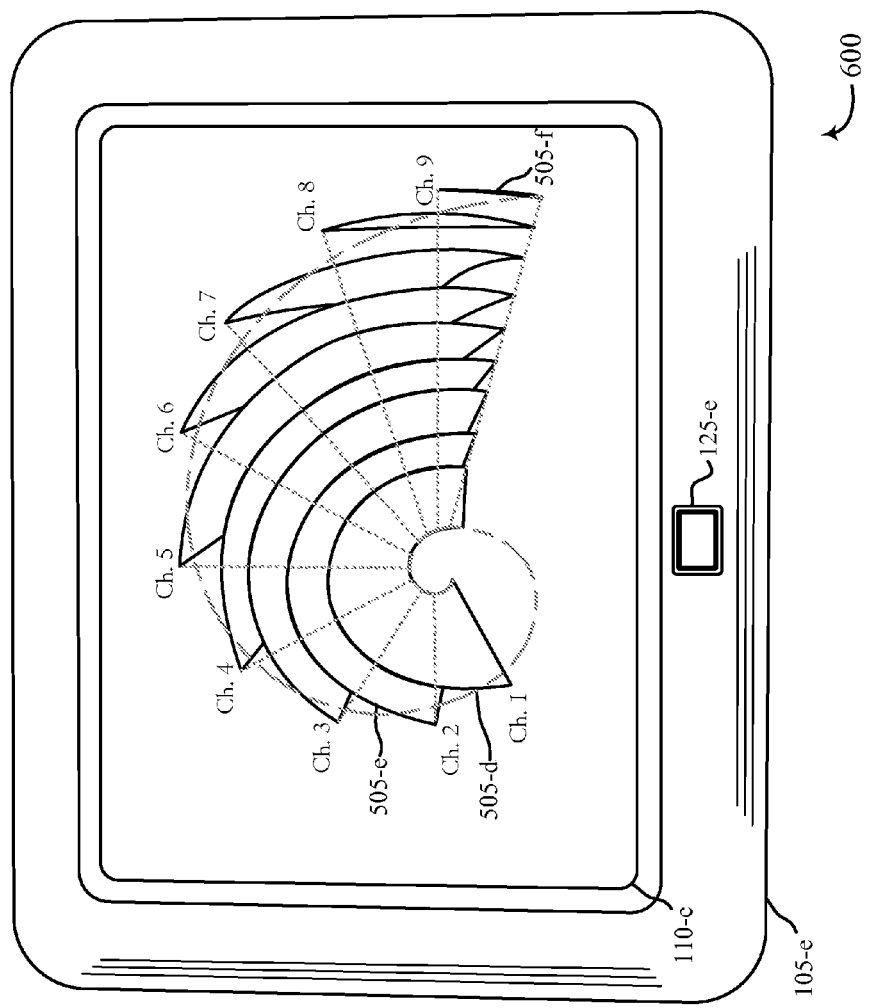
FIGS. 6A and 6B show diagrams of different viewing modes of an example display of an electronic document, according to various embodiments of the invention.
Figure 6B:
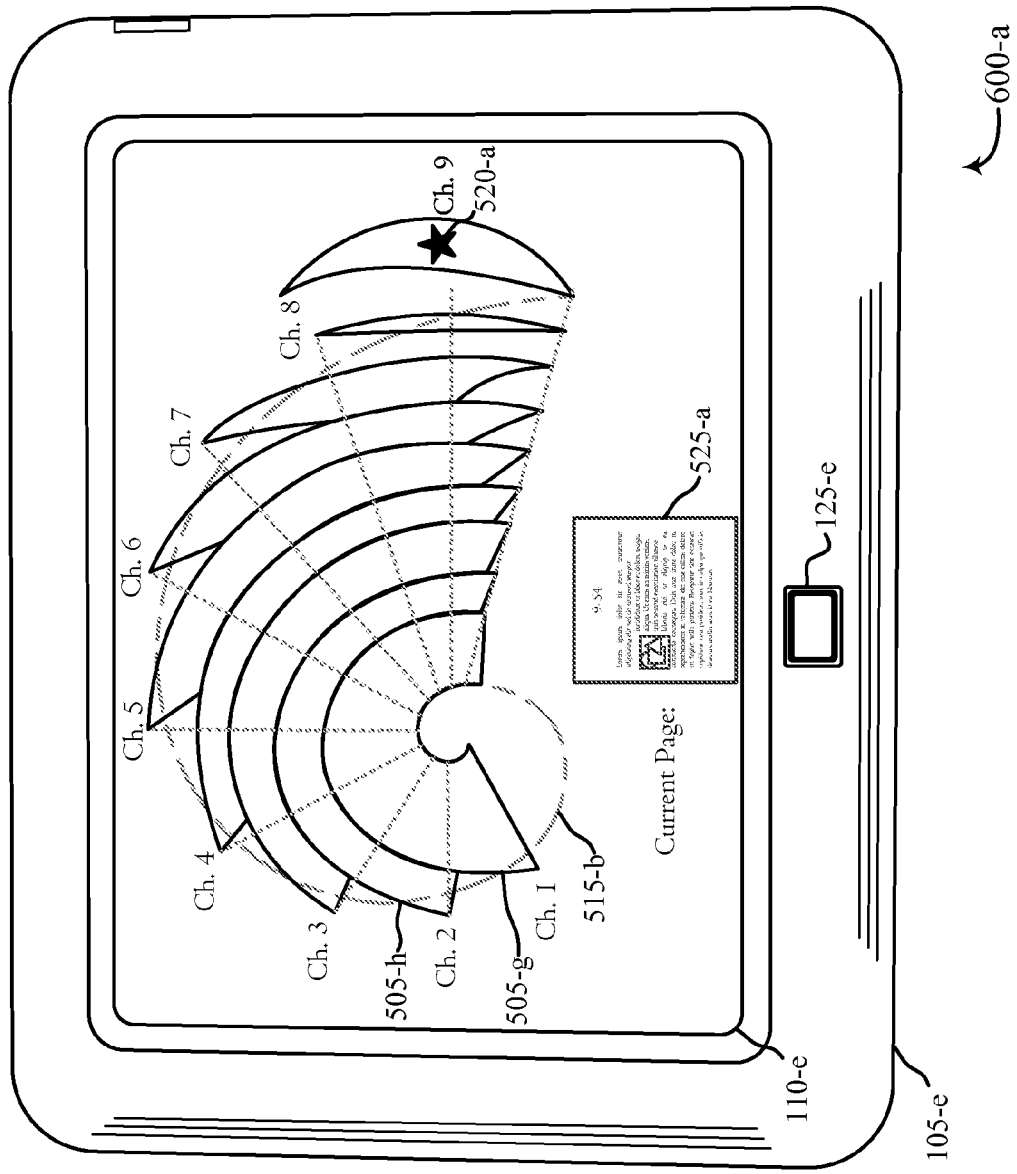

FIGS. 6A and 6B are diagrams 600 of an example mobile device 105-d with a display 110-d showing an example chapter view of an electronic document at different points in time. The mobile device 105-d of the present example may be an example of the mobile devices 105 described above with reference to FIG. 1, FIGS. 2A-2B, FIG. 3, FIG. 4, or FIGS. 5A-5B.

As with the chapter view of FIGS. 5A-5B, the chapter view of the present example includes a number of nested curved shapes 505, each curved shape 505 representing a chapter, disposed according to a spiral 515-b. In certain examples, the spiral 515-b may be a golden spiral. The curved shapes 505 may be two-dimensional projections of three-dimensional shapes disposed such that each curved shape 505 begins at the intersection of a real or imaginary ray emanating from a common point and the spiral 515. Additionally, each of the curved shapes 505 may end at the point where that curved shape 505 intersects with a ray defining the end point for all of the curved shapes 505.

FIG. 6B shows one example of navigating to a particular point of an electronic document using the chapter view of the present example. In this example, a user has selected curved shape 505-f, corresponding to Chapter 9 of the electronic document. Consequently, curved shape 505-f has been temporarily magnified, and an indicator 520-a of the current selected point in the electronic document is displayed. The indicator 520-a may track the position of the user's finger on the touchscreen display 110-d. Additionally, preview 525-a is provided of the current page corresponding to the currently selected point in the electronic document. The preview may show a scaled down view of the current page in its entirety. In alternate examples, the preview may show a larger view of a portion of the text or images on the current page.

The user may select a new current page using touchscreen input or another type of input as described above with reference to FIGS. 5A-5B. Once the new current page has been selected, the display 110-e may automatically switch to a page view based on the new current page (e.g., as shown in FIGS. 1-4). Alternatively, once the new current page has been selected, the display 110-e may prompt the user to either toggle to the page view or continue navigating within the chapter view.

Figure 7:
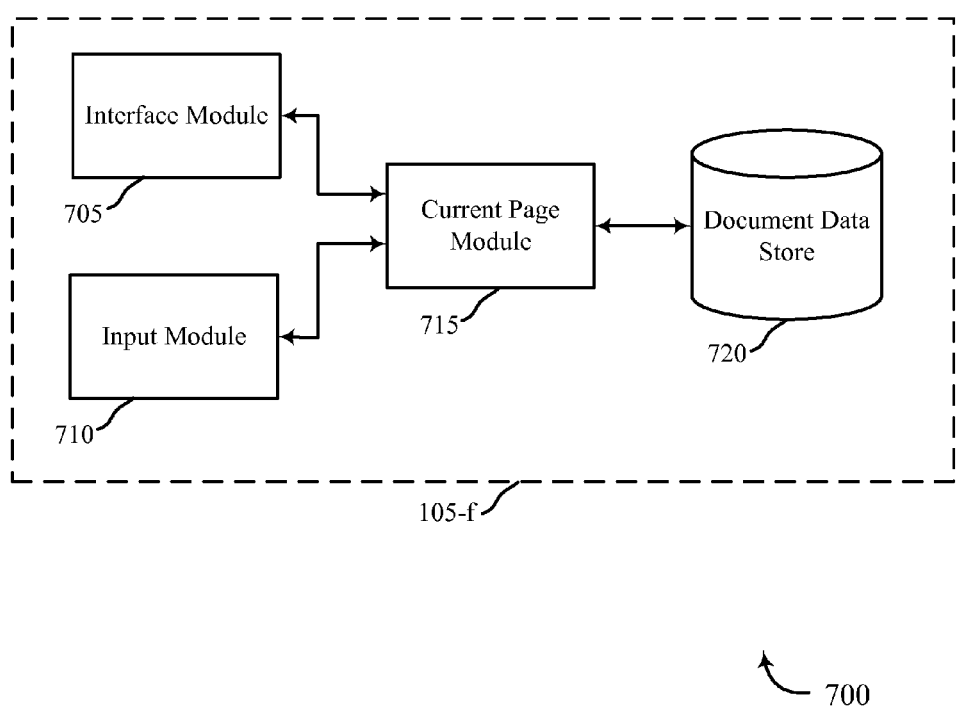
FIG. 7 shows a block diagram of an example system for display a document, according to various embodiments of the invention.

FIG. 7 is a block diagram 700 of components in an example mobile device 105-f. The mobile device 105-f may be an example of any of the mobile devices 105 described above with reference to FIG. 1, 2A-2B, 3-4, 5A-5B, or 6A-6B. The mobile device 105-f of the present example includes an interface module 705, an input module 710, a current page module 715, and a document data store 720. Each of these components may be in communication, directly or indirectly.

The mobile device 105-f may be used to display an electronic document to a user. The interface module 705 may be configured to generate a page view interface for the document by displaying a first rectangle containing a current page of the electronic document and a second rectangle adjacent to the first rectangle. The second rectangle may share a side with the first rectangle, and may include a number of pages other than the current page, as illustrated in the examples of FIG. 1, FIGS. 2A-2B, FIG. 3, and FIG. 4.

In certain examples, each of the pages contained by the second rectangle may be displayed at a size proportional to the distance of that page from the current page in the document (i.e. the page displayed in the first rectangle). Thus, the farther away from the current page that a page of the second rectangle is, the smaller that page will be displayed in the second rectangle. In other examples, the size of the pages displayed in the second rectangle may be based at least partially on an order selected by a user, an order in which each page was added to the second rectangle for display, or any other criterion that may suit a particular application of these principles.

In some examples, the first rectangle may be a square, and the second rectangle may be a golden rectangle with a length-to-width ratio substantially equal to $\varphi$. This arrangement may make it possible to neatly arrange the rectangles into a recursive pattern with efficient use of space and aesthetic appeal. For example, a third rectangle may be shown within the second rectangle that contains a page immediately previous to the current page or a bookmarked page. Also shown within the third rectangle may be a fourth rectangle adjacent to the third rectangle, the fourth rectangle sharing a side with the third rectangle and containing a number of additional pages. The third rectangle may be a square and the fourth rectangle may be a golden rectangle. This pattern may repeat such that each page displayed by the interface module 705 is displayed as a square and each golden rectangle includes a number of pages.

In additional or alternative examples, the interface module 705 may be configured to generate a chapter view of the document by displaying a number of curved shapes arranged according to a spiral, with each of the curved shapes representing a portion (e.g., a chapter) of the document. The document may be navigated in the chapter view by selecting one of the curved shapes corresponding to a desired portion of the document, and navigating along the selected curved shape to reach a selected current page.

The input module 710 may be configured to receive a rotational motion input or other input at the device used to select a new current page based on the page view or chapter view interface displayed by the interface module 705. For example, the input received at the input module 710 may include a substantially circular finger movement to advance or regress a current page of the document. Additionally or alternatively, the input received at the input module 710 may be received from one or more separate hardware controls, such as buttons or touchpads.

The current page module 715 may keep track of the current page of the document based on the input received at the input module 710. The current page module 715 may be configured to interpret the input received from the input module 710 to determine a new current page. In certain examples, such as when a customer provides a continuous finger motion on a touchpad, the current page module 715 may dynamically update the current page of the document as the motion progresses to allow a user to navigate the pages in the document in real-time based on touch input. In certain examples, the current page module 715 may track a direction associated with the input received at the input module 710 and navigate forward or backward in the document based on the direction of the input.

The document data store 720 may store the electronic document. The document data store 720 may be a single database, or may be made up of any number of separate and distinct databases. The document data store 720 may include one, or more, relational databases or components of relational databases (e.g., tables), object databases, or components of object databases, spreadsheets, text files, internal software lists, or any other type of data structure suitable for storing data. Thus, it should be appreciated that a data store may each be multiple data storages (of the same or different type), or may share a common data storage with other data stores.

The current page module 715 may communicate with the document data store 720 as the current page module 715 navigates through the document. Additionally, the document data store 720 may provide to the interface module 705 the content of the current page for rendering in the first rectangle of the interface and the content of pages selected for viewing in the second rectangle for rendering in the second rectangle of the interface.

Figure 8:
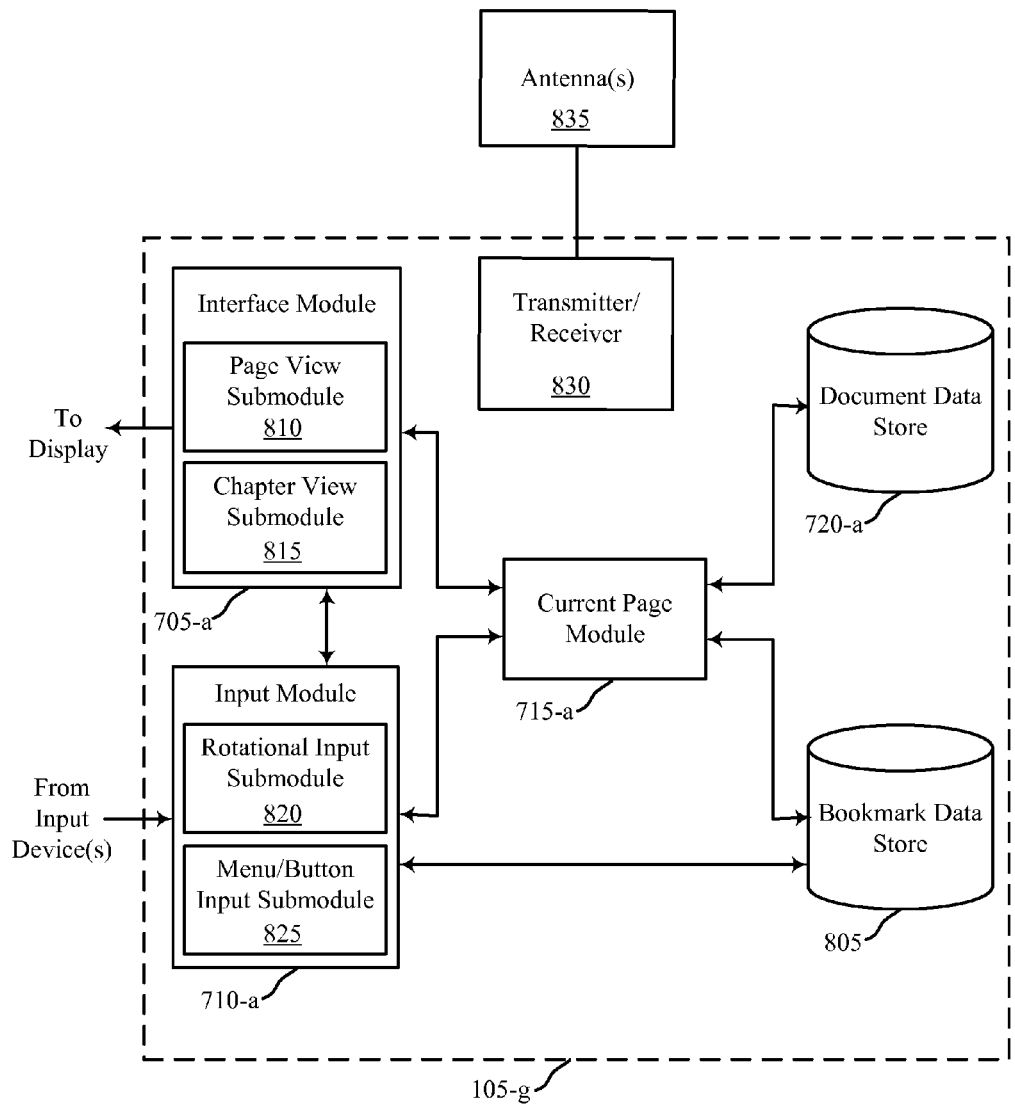
FIG. 8 shows a block diagram of an example system for display a document, according to various embodiments of the invention.

FIG. 8 is a block diagram 800 of components in an example mobile device 105-*g*. The mobile device 105-*g* may be an example of any of the mobile devices 105 described above with reference to FIG. 1, 2A-2B, 3-4, 5A-5B, 6A-6B, or 7. The mobile device 105-*g* of the present example includes an interface module 705-*a*, an input module 710-*a*, a current page module 715, a document data store 720-*a*, a bookmark data store 805, a transceiver/receiver module 830, and an antenna 835. Each of these components may be in communication, directly or indirectly. The interface module 705-*a*, input module 710-*a*, current page module 715, and document data store 720-*a* may be examples of, respectively, the interface module 705, the input module 710, the current page module 715, and the document data store 720 of FIG. 7.

The interface module 705-*a* of the present example may include a page view submodule 810 configured to generate a page view interface and a chapter view submodule 815 configured to generate a chapter view interface. The page view interface may include a first rectangle containing the current page of the document and the second rectangle adjacent to the first rectangle which contains a number of pages other than the current page, as described above. The chapter view may include a number of curved shapes arranged according to a spiral, each of the curved shapes representing a portion (e.g., a chapter) of the document, as described with respect to previous Figures. In certain examples, the page view of the document may be displayed by default, and the chapter view may be displayed upon receiving a request at the input module 710-*a* to switch to the chapter view. Alternatively, the chapter view of the document may be the default view, and a user may request the page view through the input module 710-*a*.

The input module 710-*a* of the present example may include a rotational input submodule 820 and a menu/button input submodule 825. The rotational input submodule 820 may be configured to receive circular motion input generated by a user finger at a touch pad input device. The menu/button input submodule 825 may be configured to receive input from a user via hardware or soft buttons or controls. The input received from the either submodule 820, 825 of the input module 710-*a* may provide navigational information to the current page module 715-*a*, manage and add to a set of bookmarked pages stored at the bookmark data store 805 for display as part of the page view interface, toggle between the page view interface and chapter view interface, bring up a home menu, and/or any other action that may suit a particular application of these principles.

The transmitter/receiver module 830 of the mobile device 105-*g* in the present example may be communicatively coupled with one or more antennas 835 to enable wireless communications between the mobile device 105-*g* and other system and devices. In certain examples, the mobile device 105-*g* may communicate with one or more central server computer systems over a cellular, WLAN, or other wireless network to receive data related to the display of the document. For instance, the electronic document may be downloaded over a wireless network and stored in the document data store 720-*a* prior to the interface module 705-*a* generating a page view or chapter view interface for displaying the document to a user. In some examples, various aspects of the interface may be provided to the mobile device 105-*g* over the one or more mobile networks.

Additionally or alternatively, information from the one or more mobile networks may be used to synchronize a display of the document across multiple devices. For example, a user may begin reading a particular electronic document on a first device, and then transition to the mobile device 105-*g* to continue reading the document. The mobile device 105-*g* may receive a last accessed page of the electronic document from the first device or another source and the current page module 715-*a* may set the current page to the received page in the document to allow the user to resume reading the document where the user left off.

Figure 9:
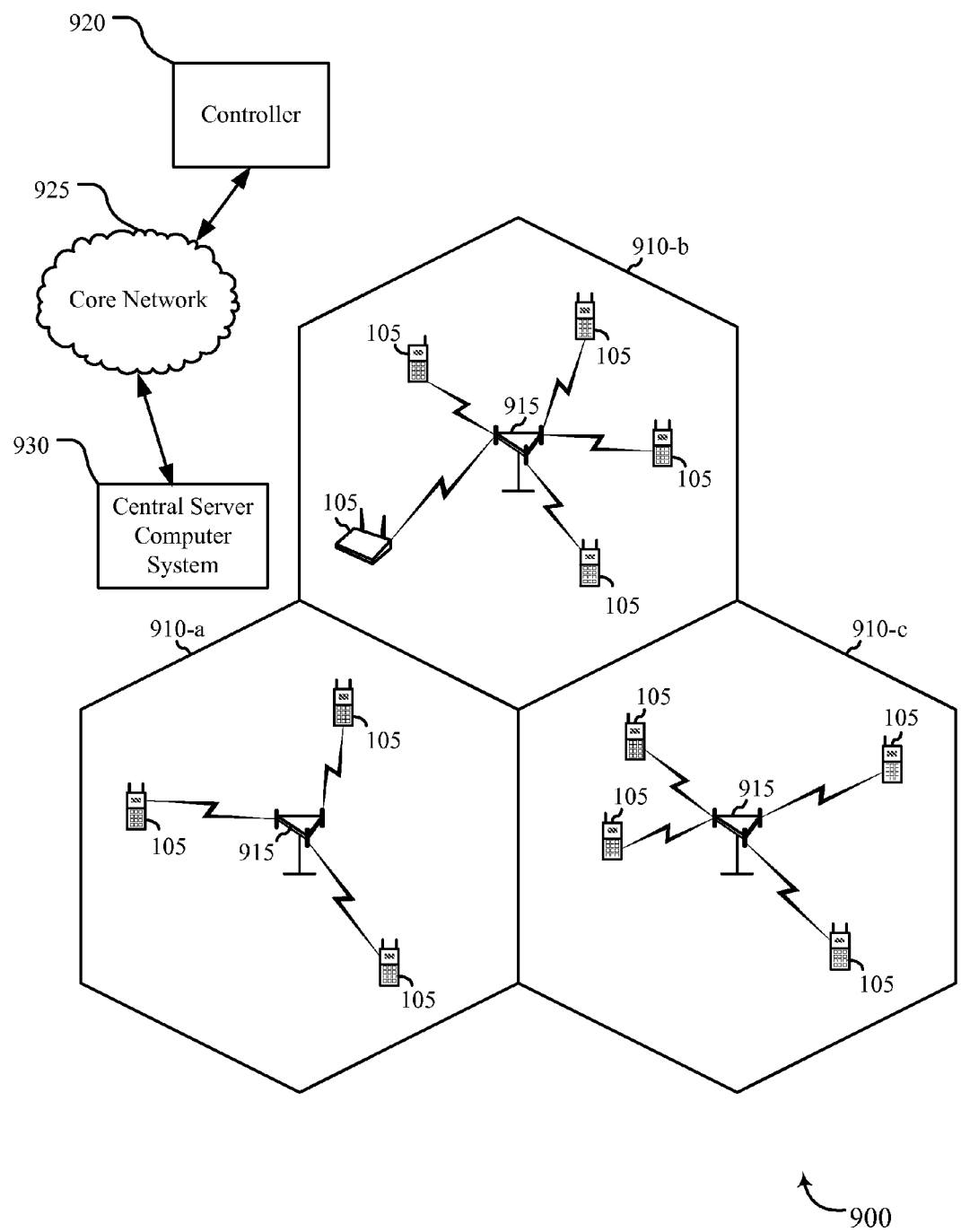
FIG. 9 shows a diagram of an example system for mobile communications, according to various embodiments of the invention.

FIG. 9 is a block diagram of an example mobile network system 900 which may be used to display electronic documents on one or more mobile devices 105. In certain examples, a central server computer system 930 may be configured to perform one or more of the functions that are performed by the example mobile devices 105 of FIGS. 7 and 8. For example, the central server computer system 930 may store electronic documents and generate page view or chapter view interfaces for display at the mobile devices 105. The content of the electronic documents and/or interfaces may be communicated to the mobile devices 105 over a core network 925 and a system of cellular base stations 915.

The system 900 may include base stations 915 (or cells), mobile devices 105, a base station controller 920, a core network 925, and the central server computer system 930 (the controller 920 and central server computer system 930 may be integrated into the core network 925). The mobile devices 105 may be examples of the mobile devices 105 described above with reference to FIGS. 1-8. The system 900 may support operation on multiple carriers (waveform signals of different frequencies).

The base stations 915 may wirelessly communicate with the mobile devices 105 via a base station antenna (not shown). The base stations 915 may communicate with the mobile devices 105 under the control of the base station controller 920 via multiple carriers. Each of the base station 915 sites may provide communication coverage for a respective geographic area. The coverage area for each base station 915 here is identified as 910-a, 910-b, or 910-c. The coverage area for a base station may be divided into sectors (not shown, but making up only a portion of the coverage area). The system 900 may include base stations 915 of different types (e.g., macro, micro, and/or pico base stations). There may be overlapping coverage areas for different technologies.

The mobile devices 105 may be dispersed throughout the coverage areas 910. The mobile devices 105 may be referred to as mobile stations, mobile devices, access terminals (ATs), user equipments (UEs), subscriber stations (SSs), or subscriber units. The mobile devices 105 may include cellular phones and wireless communications devices, but may also include personal digital assistants (PDAs), other handheld devices, netbooks, notebook computers, etc.

Thus, using the system 900 of the present example, the central server computer system 930 may communicate with individual mobile devices 105 to provide document content, generate interfaces, receive user input, and/or perform any other action relevant to displaying a document according to the principles of the present description. In certain examples, the central server computer system 930 may simply communicate with one or more mobile devices 105 to allow the mobile devices 105 to download electronic documents over the cellular network, and the mobile devices 105 may autonomously manage the display and navigation of the electronic documents. In additional or alternate examples, one or more mobile devices 105 may function as a thin client that relays user input to the central server computer system 930 over the cellular network and receives a generated interface to display to the user from the central server computer network 930.

Figure 10:
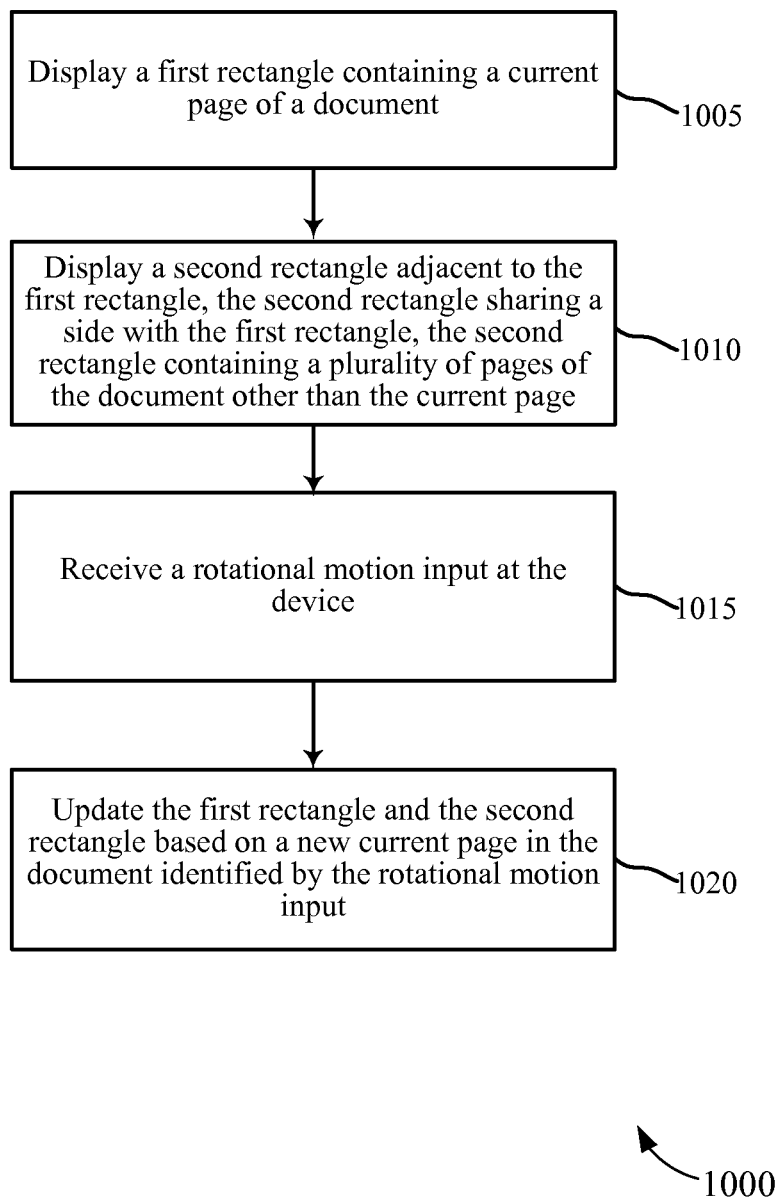
FIG. 10 shows a flowchart of a method for displaying a document, according to various embodiments of the invention.

FIG. 10 shows a flowchart diagram of an example method 1000 of displaying a document on a device. The method 1000 may be performed, for example, by any of the mobile devices 105 of FIGS. 1-9.

At block 1005, a first rectangle containing a current page of a document is displayed. In certain examples, the first rectangle may be a square. At block 1010, a second rectangle is displayed adjacent to the first rectangle, the second rectangle sharing a side with the first rectangle. The second rectangle may contain a plurality of pages of the document other than the current page.

In certain examples, the second rectangle may contain a number of pages immediately prior to the current page displayed in the first rectangle. Additionally or alternatively, the second rectangle may contain a number of pages leading up to the current page in linear or nonlinear steps. In other additional or alternative examples, the second rectangle may contain one or more bookmarked pages from the document that remain static regardless of the current page. In certain examples, the size of each page displayed in second rectangle may be based at least partially on the distance of that page from the current page in the document. Additionally or alternatively, the size of each page displayed in the second rectangle may be based on at least one of a user selection, an order in which the pages were added to the second rectangle, a content of the pages, or any other criterion that may suit a particular application of these principles.

In certain examples, the first and second rectangle may be part of a recursive pattern for displaying the pages. For example, the method may include displaying within the second rectangle a third rectangle containing a page immediately previous to the current page, and a fourth rectangle adjacent to the third rectangle containing a number of pages prior to the page immediately previous to the current page. By making each rectangle that contains a single page (e.g., the first rectangle, the third rectangle, etc.) a square and each rectangle that contains multiple pages (e.g., the second rectangle, the fourth rectangle, etc.) a golden rectangle, the rectangles may be arranged in an aesthetically pleasing manner that maximizes the efficiency of screen real estate.

At block 1015, a rotational motion input is received at the device. In certain examples, this rotational motion input may be a circular touch input received at a touchscreen. Additionally or alternatively, the rotational motion input may be received through a hardware control, such as a touchpad or a wheel. At block 1020, the first rectangle and the second rectangle are updated based on a new current page in the document identified by the rotational motion input. In certain examples, the current page may be continuously updated as the rotational input is received, thereby allowing for real-time navigation through the pages of the document based on the rotational input. The direction of the navigation may be based at least in partially on a direction of the rotational motion input.

Figure 11:
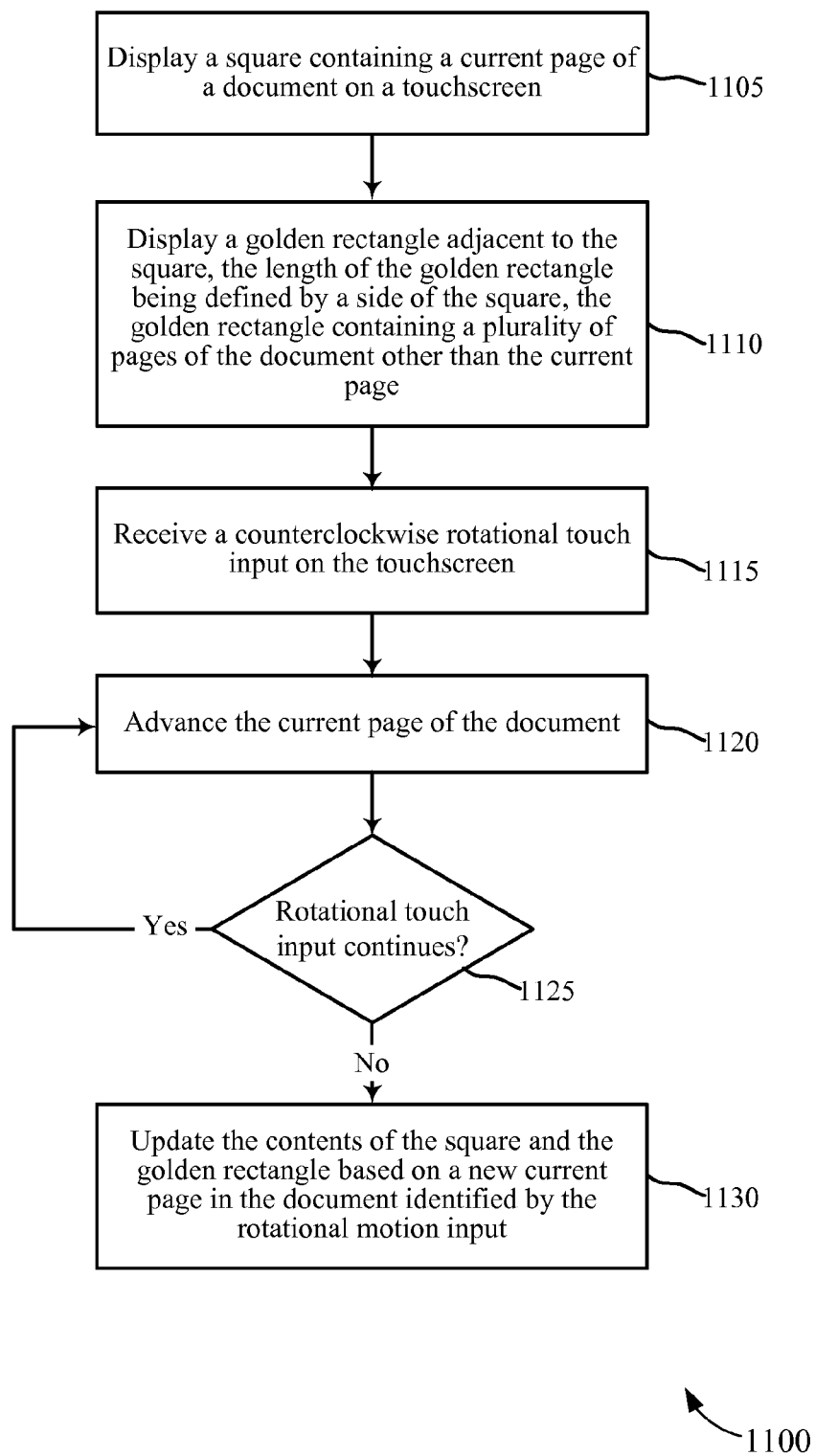
FIG. 11 shows a flowchart of a method for displaying a document, according to various embodiments of the invention.

FIG. 11 shows a flowchart diagram of another example method 1100 of displaying a document on a device. The method 1100 may be performed, for example, by any of the mobile devices 105 of FIGS. 1-9. The method 1100 may be an example of the method 1000 described above with reference to FIG. 10.

At block 1105, a square is displayed on a touchscreen, the square containing a current page of a document. At block 1110, a golden rectangle is displayed adjacent to the square, the length of the golden rectangle being defined by a side of the square. The golden rectangle may contain a number of pages of the document other than the current page displayed in the square.

At block 1115, a counterclockwise rotational touch input is received on the touchscreen. At block 1120, the current page of the document is advanced based on the direction of the rotational touch input received. This advancement of the current page continues for the duration of the rotational touch input (block 1125, Yes). When the rotational touch input has finished (block 1125, No), the contents of the square and the golden rectangle are updated based on a new current page in the document identified by the rotational motion input at block 1130. In certain examples, the contents of the square and the golden rectangle may be continuously updated as the rotational touch input is received.

Figure 12:
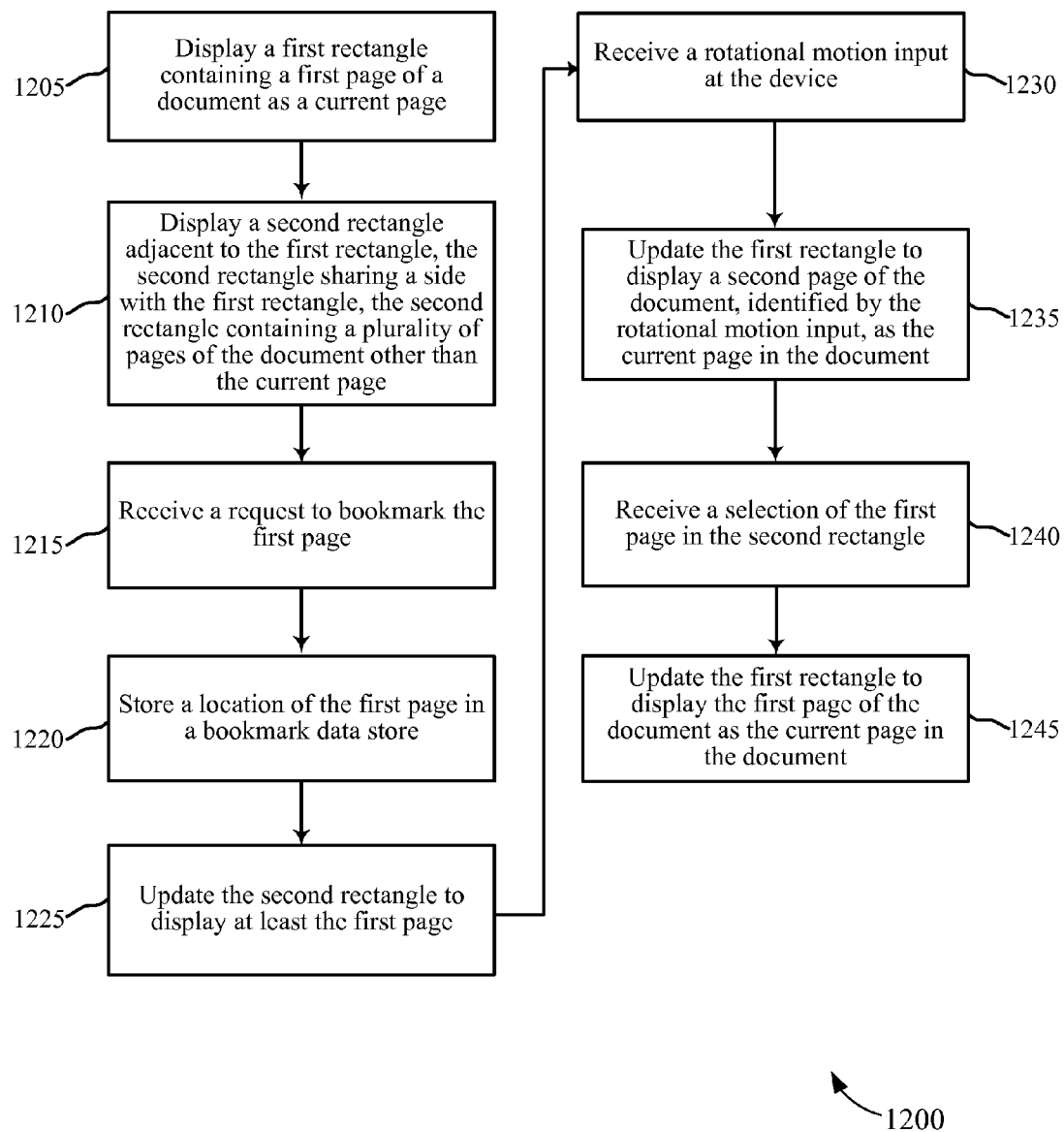
FIG. 12 shows a flowchart of a method for displaying a document, according to various embodiments of the invention.

FIG. 12 shows a flowchart diagram of another example method 1200 of displaying a document on a device. The method 1200 may be performed, for example, by any of the mobile devices 105 of FIGS. 1-9. The method 1200 may be an example of the method 1000 described above with reference to FIG. 10 or the method 1100 described above with reference to FIG. 11.

At block 1205, a first rectangle ids displayed containing a first page of a document as the current page. At block 1210, a second rectangle is displayed adjacent to the first rectangle, the second rectangle sharing a side with the first rectangle. The second rectangle may contain a number of pages of the document other than the current page. In certain examples, the first rectangle is a square and the second rectangle is a golden rectangle.

At block 1215, a request is received to bookmark the first page. The request may be received from a user through a physical or soft control. Additionally or alternatively, the request may be received by the user performing a specified gesture (e.g., dragging and dropping the current page to the second rectangle) on a touchscreen. At block 1220, a location of the first page is stored in a bookmark data store. At block 1225, the second rectangle is updated to display at least the first page as a bookmarked page.

At block 1230, a rotational motion input is received at the device. The rotational motion input may be received through a touchscreen, a hardware control, or another type of control. At block 1235, the first rectangle is updated to display a second page of the document as the new current page in the document, the second page being identified by the rotational motion input. At block 1240, a selection of the first page in the second rectangle is received. The selection may be received as a touch input on a touch screen or as some other type of input. At block 1245, the first rectangle is updated to display the first page of the document as the current page in the document.

Figure 13:
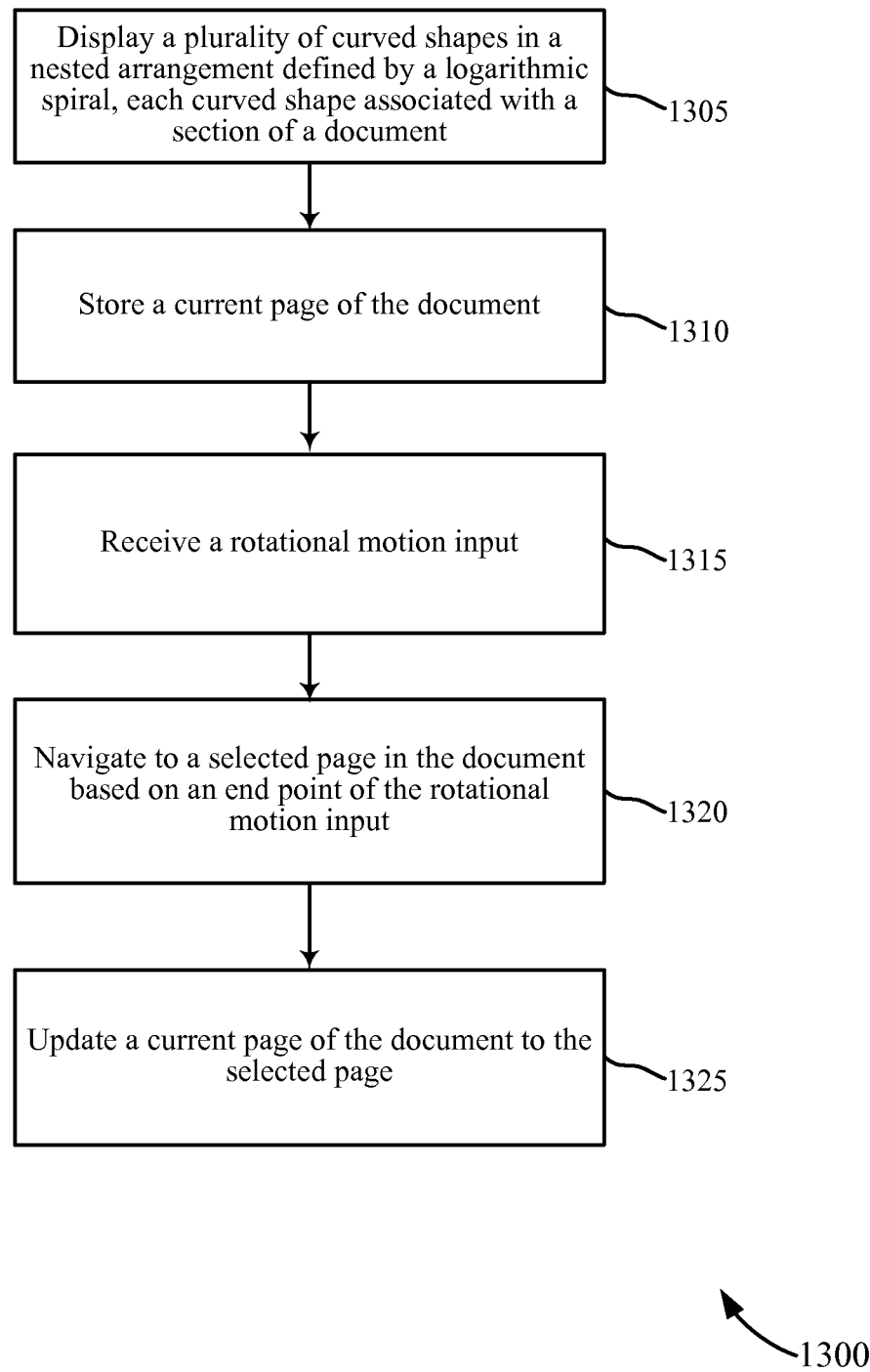
FIG. 13 shows a flowchart of a method for displaying a document, according to various embodiments of the invention.

FIG. 13 shows a flowchart diagram of another example method 1300 of displaying a document on a device. The method 1300 may be performed, for example, by any of the mobile devices 105 of FIGS. 1-9. The method 1300 may be an example of the method 1000 described above with reference to FIG. 10, the method 1100 described above with reference to FIG. 11, or the method 1200 described above with reference to FIG. 12.

The method 1300 of FIG. 13 may be directed to displaying a chapter view of the document, consistent with the principles described herein. At block 1305, a number of curved shapes are displayed in a nested arrangement defined by a logarithmic spiral, each curved shape being associated with a section of a document, such as a chapter. In certain examples, the logarithmic spiral may be a golden spiral, that is, a spiral having a growth factor substantially equal to φ.

At block 1310, a current page of the document is stored. At block 1315, a rotational motion input is received. In certain examples, the rotational motion input may be received subsequent to a selection of one of the curved shapes. Alternatively, a selection of a curved shape may be implicit in a current page of the document. An indication of the current page may be displayed over the selected curved shape, and the selected curved shape may be magnified.

At block 1320, the device navigates to a selected page in the document based on at least an end point of the rotational motion input. The selected page may be further determined based on at least one of a direction of the rotational motion, a speed of the rotational motion, or a duration of the rotational motion. At block 1325, the current page of the document is updated to the selected page. In certain examples, the current page is continuously updated based on the rotational motion input as the rotational motion input is received, thereby allowing for real-time navigation through the document. In certain examples, a preview of the current page may be displayed before, during, and/or after the navigation to the new current page.

Figure 14:
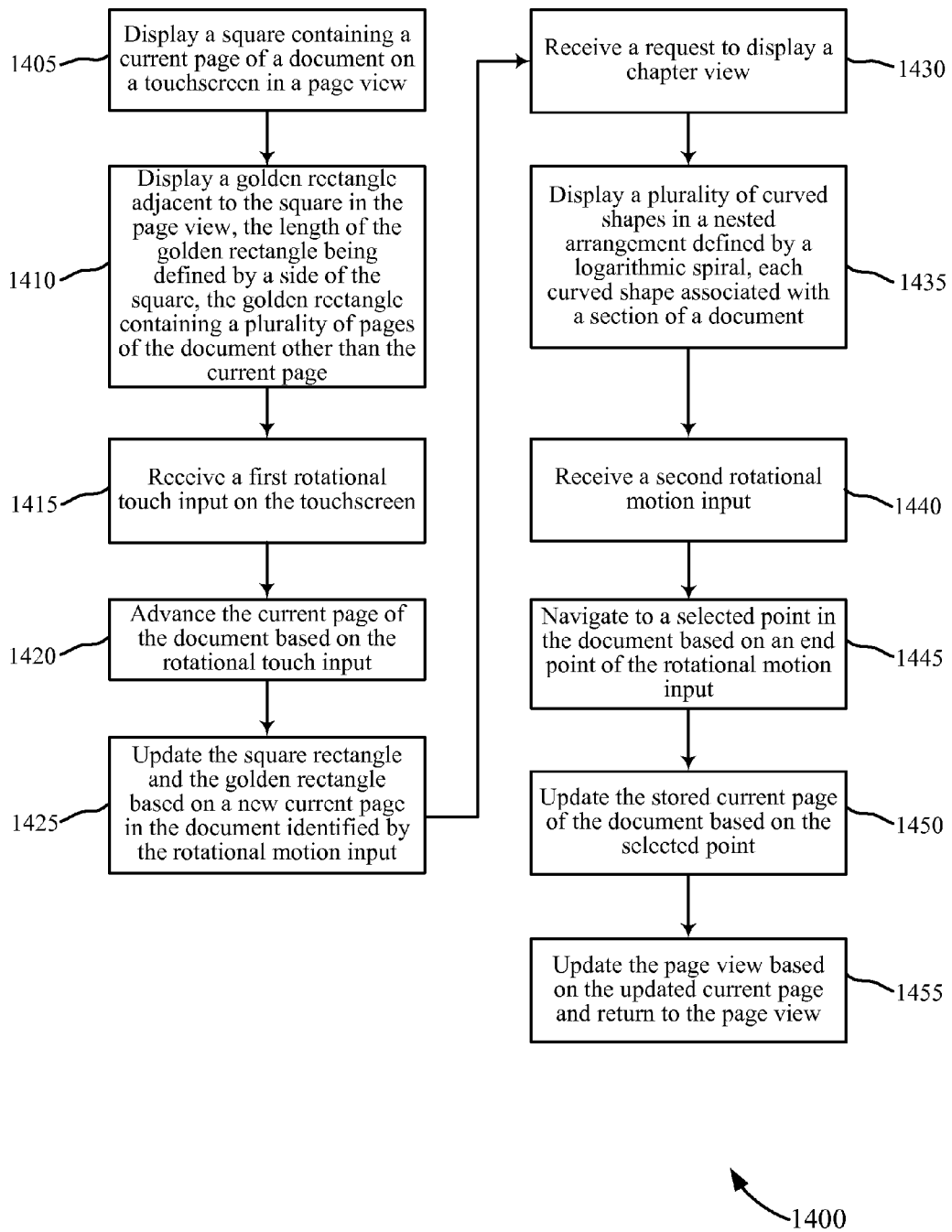
FIG. 14 shows a flowchart of a method for displaying a document, according to various embodiments of the invention.

FIG. 14 shows a flowchart diagram of another example method 1400 of displaying a document on a device. The method 1400 may be performed, for example, by any of the mobile devices 105 of FIGS. 1-9. The method 1400 may be an example of the method 1000 described above with reference to FIG. 10, the method 1100 described above with reference to FIG. 11, the method 1200 described above with reference to FIG. 12, or the method 1300 described above with reference to FIG. 13.

At block 1405, a square containing a current page of the document is displayed on a touch screen in a page view of the document. At block 1410, a golden rectangle is displayed adjacent to the square in the page view, the length of the golden rectangle being defined by a side of the square. The golden rectangle may include a number of pages of the document other than the current page (e.g., pages immediately prior to or following the current page, bookmarked pages, etc.). At block 1415, a first rotational touch input is received on the touchscreen. At block 1420, the current page of the document is advanced based on the rotational touch input. At block 1425, the contents of the square and the golden rectangle are updated based on the new current page in the document identified by the rotational motion input.

At block 1430, a request is received to display a chapter view of the document. At block 1435, a number of curved shapes are displayed in a nested arrangement defined by a logarithmic spiral, each of the curved shapes being associated with a section of the document. At block 1440, a second rotational motion input is received. At block 1445, the device navigates to a selected page in the document based at least in part on an end point of the rotational motion input. At block 1450, the stored current page of the document is updated based on the selected point. At block 1455, the page view is updated based on the updated current page, and the updated page view is displayed. In certain examples, the updated page view may be displayed following a direct or implicit request to toggle from the chapter view to the page view.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and BLU-RAY disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of displaying a document on a device, comprising:
    displaying a first substantially rectangular shape comprising a current page of the document;
    displaying a second substantially rectangular shape substantially adjacent to the first substantially rectangular shape, the second substantially rectangular shape comprising a plurality of pages other than the current page;
    displaying each page of the plurality of pages in the second substantially rectangular shape at a size proportional to a distance of that page from the current page in the document;
    receiving a rotational motion input at the device, the rotational motion input comprising a circular motion received on a touch-screen display of the device while maintaining a physical orientation of the device;
    displaying a new current page in the first substantially rectangular shape responsive to the rotational motion input; and
    updating the second substantially rectangular shape based on the new current page in the document identified by the rotational motion input.

2. The method of claim 1, further comprising:
    displaying within the second substantially rectangular shape a third substantially rectangular shape comprising a page immediately previous to the current page.

3. The method of claim 2, further comprising:
    displaying within the second substantially rectangular shape a fourth substantially rectangular shape adjacent to the third substantially rectangular shape, the fourth substantially rectangular shape sharing a side with the third substantially rectangular shape and comprising a plurality of pages prior to the page immediately previous to the current page.

4. The method of claim 1, further comprising:
    receiving a selection of one of the pages of the plurality of pages other than the current page; and
    updating the current page based on the selected page.

5. The method of claim 1, wherein the second substantially rectangular shape shares a side with the first substantially rectangular shape.

6. The method of claim 1, wherein the first substantially rectangular shape comprises a square and the second substantially rectangular shape comprises a length-to-width ratio substantially equal to $\varphi$, which is the golden ratio.

7. The method of claim 1, wherein the plurality of pages other than the current page comprises at least one page of the document selected by the user for bookmarking.

8. The method of claim 1, further comprising:
continuously updating the current page in real-time as the rotational motion input is received to navigate the pages in the document based on the rotational motion input.

9. The method of claim 8, further comprising:
controlling a direction of the navigation based on a direction of the rotational motion input.

10. The method of claim 1, further comprising:
receiving a request to display a chapter view of the document;
displaying a number of curved shapes arranged according to a spiral, each of the curved shapes representing a portion of the document;
receiving a second rotational motion input; and
based on an end point of the received second rotational motion input and the displayed representation of the different chapters of the document, updating the current page of the document.

11. The method of claim 10, wherein the spiral comprises a logarithmic spiral comprising a growth factor substantially equal to $\varphi$, which is the golden ratio.

12. The method of claim 10, further comprising:
allowing a user to navigate through a magnified representation of a selected chapter; and
updating the current page based on a page selected from the magnified representation of the selected chapter.

13. A system of displaying a document on a device, comprising:
a touch-screen display configured to:
display a first substantially rectangular shape comprising a current page of the document and a second substantially rectangular shape substantially adjacent to the first substantially rectangular shape, the second substantially rectangular shape comprising a plurality of pages other than the current page;
display each page of the plurality of pages in the second substantially rectangular shape at a size proportional to a distance of that page from the current page in the document;
receive a rotational motion input at the device, the rotational motion input comprising a circular motion received on the touch-screen display while maintaining a physical orientation of the device; and
display a new current page in the first substantially rectangular shape responsive to the rotational motion input; and
a processor configured to update the second substantially rectangular shape based on the new current page in the document identified by the rotational motion input.

14. The system of claim 13, wherein the touch-screen display is further configured to receive a selection of one of the pages of the plurality of pages other than the current page; and wherein the process is further configured to update the current page based on the selected page.

15. The system of claim 13, wherein the second substantially rectangular shape shares a side with the first substantially rectangular shape.

16. The system of claim 13, wherein the first substantially rectangular shape comprises a square and the second substantially rectangular shape comprises a length-to-width ratio substantially equal to $\varphi$, which is the golden ratio.

17. The system of claim 13, wherein the plurality of pages other than the current page comprises at least one page of the document selected by the user for bookmarking.

18. A system of displaying a document on a device, comprising:
means for displaying a first substantially rectangular shape comprising a current page of the document;
means for displaying a second substantially rectangular shape substantially adjacent to the first substantially rectangular shape, the second substantially rectangular shape comprising a plurality of pages other than the current page;
means for displaying each page of the plurality of pages in the second substantially rectangular shape at a size proportional to a distance of that page from the current page in the document;
means for receiving a rotational motion input at the device, the rotational motion input comprising a circular motion received on a touch-screen display of the device while maintaining a physical orientation of the device;
means for displaying a new current page in the first substantially rectangular shape responsive to the rotational motion input; and
means for updating the first substantially rectangular shape and the second substantially rectangular shape based on a new current page in the document identified by the rotational motion input.

19. The system of claim 18, further comprising:
means for displaying within the second substantially rectangular shape a third substantially rectangular shape comprising a page immediately previous to the current page.

20. The system of claim 18, further comprising:
means for displaying within the second substantially rectangular shape a fourth substantially rectangular shape adjacent to the third substantially rectangular shape, the fourth substantially rectangular shape sharing a side with the third substantially rectangular shape and comprising a plurality of pages prior to the page immediately previous to the current page.

21. The system of claim 18, further comprising:
means for receiving a selection of one of the pages of the plurality of pages other than the current page; and
means for updating the current page based on the selected page.

22. The system of claim 18, wherein the second substantially rectangular shape shares a side with the first substantially rectangular shape.

23. The system of claim 18, wherein the first substantially rectangular shape comprises a square and the second substantially rectangular shape comprises a length-to-width ratio substantially equal to $\varphi$, which is the golden ratio.

24. The system of claim 18, wherein the plurality of pages other than the current page comprises at least one page of the document selected by the user for bookmarking.

25. The system of claim 18, further comprising:
means for continuously updating the current page in real-time as the rotational motion input is received to navigate the pages in the document based on the rotational motion input.

26. The system of claim 18, further comprising:
means for controlling a direction of the navigation based on a direction of the rotational motion input.

27. The system of claim 18, further comprising:
means for receiving a request to display a chapter view of the document;
means for displaying a number of curved shapes arranged according to a spiral, each of the curved shapes representing a portion of the document;
means for receiving a second rotational motion input; and means for updating the current page of the document based on an end point of the received second rotational motion input and the displayed representation of the different chapters of the document.

28. The system of claim 27, wherein the spiral comprises a logarithmic spiral comprising a growth factor substantially equal to φ, which is the golden ratio.

29. The system of claim 27, further comprising:
means for allowing a user to navigate through a magnified representation of a selected chapter; and
means for updating the current page based on a page selected from the magnified representation of the selected chapter.

30. A computer program product configured to display a document on a device, the product comprising a non-transitory computer-readable medium, the medium comprising:
code to display a first substantially rectangular shape comprising a current page of the document;
code to display a second substantially rectangular shape substantially adjacent to the first substantially rectangular shape, the second substantially rectangular shape comprising a plurality of pages other than the current page;
code to display each page of the plurality of pages in the second substantially rectangular shape at a size proportional to a distance of that page from the current page in the document;
code to receive a rotational motion input at the device, the rotational motion input comprising a circular motion received on a touch-screen display of the device while maintaining a physical orientation of the device;
code to display a new current page in the first substantially rectangular shape responsive to the rotational motion input; and
code to update the first substantially rectangular shape and the second substantially rectangular shape based on a new current page in the document identified by the rotational motion input.

31. A method of displaying a document on a device, comprising:
displaying a plurality of curved shapes in a nested arrangement defined by a spiral, each of the curved shapes associated with a portion of the document, wherein the spiral comprises a logarithmic spiral with a growth factor substantially equal to φ, which is the golden ratio;
storing a current page of the document;
receiving a rotational motion input at the device, the rotational motion input comprising a circular motion received on a touch-screen display of the device while maintaining a physical orientation of the device;
navigating to a selected page in the document based on at least an endpoint of the rotational motion input; and
updating the current page of the document to the selected page.

32. The method of claim 31, further comprising:
displaying an indication of the current page over a curved shape of the plurality of curved shapes associated with the current page.

33. The method of claim 32, further comprising:
magnifying the curved shape of the plurality of curved shapes associated with the current page.

34. The method of claim 31, further comprising:
continuously updating the current page based on the rotational motion input as the rotational motion input is received.

35. The method of claim 31, further comprising:
displaying a preview of the current page.

36. The method of claim 31, further comprising:
receiving a request to switch to a page view of the document;
displaying a first substantially rectangular shape comprising the current page of the document; and
displaying a second substantially rectangular shape substantially adjacent to the first substantially rectangular shape, the second substantially rectangular shape comprising a plurality of pages other than the current page.

37. The method of claim 36, further comprising:
receiving a second rotational motion input at the device;
updating the current page of the document based on the second rotational motion input; and
updating the first substantially rectangular shape and the second substantially rectangular shape based on the updated current page.

38. The method of claim 36, wherein the first substantially rectangular shape comprises a square and the second substantially rectangular shape comprises a length-to-width ratio substantially equal to φ, which is the golden ratio.

39. A system of displaying a document on a device, comprising:
a touch-screen display configured to:
display a plurality of curved shapes in a nested arrangement defined by a spiral, each of the curved shapes associated with a portion of the document, wherein the spiral comprises a logarithmic spiral with a growth factor substantially equal to φ, which is the golden ratio;
receive a rotational motion input at the device, the rotational motion input comprising a circular motion received on a touch-screen display of the device while maintaining a physical orientation of the device; and
a processor configured to store a current page of the document, navigate to a selected page in the document based on at least an end point of the rotational motion input, and update the current page of the document to the selected page.

40. The system of claim 39, wherein the touch-screen display is further configured to:
display an indication of the current page over a curved shape of the plurality of curved shapes associated with the current page.

41. The system of claim 39, wherein the processor is further configured to:
continuously update the current page based on the rotational motion input as the rotational motion input is received.

42. The system of claim 39, wherein:
the processor is further configured to receive a request to switch to a page view of the document; and
the touch-screen display is further configured to:
display a first substantially rectangular shape comprising the current page of the document; and
display a second substantially rectangular shape adjacent to the first substantially rectangular shape, the second substantially rectangular shape comprising a plurality of pages other than the current page.

43. A system of displaying a document on a device, comprising:
means for displaying a plurality of curved shapes in a nested arrangement defined by a spiral, each of the curved shapes associated with a portion of the document, wherein the spiral comprises a logarithmic spiral with a growth factor substantially equal to φ, which is the golden ratio;

means for storing a current page of the document;

means for receiving a rotational motion input, the rotational motion input comprising a circular motion received on a touch-screen display of the device while maintaining a physical orientation of the device;

means for navigating to a selected page in the document based on at least an end point of the rotational motion input; and means for updating the current page of the document to the selected page.

44. The system of claim 43, further comprising:

means for displaying an indication of the current page over a curved shape of the plurality of curved shapes associated with the current page.

45. The system of claim 43, further comprising:

means for continuously updating the current page based on the rotational motion input as the rotational motion input is received.

46. The system of claim 43, further comprising:

means for receiving a request to switch to a page view of the document;

means for displaying a first substantially rectangular shape comprising the current page of the document; and means for displaying a second substantially rectangular shape adjacent to the first substantially rectangular shape, the second substantially rectangular shape and comprising a plurality of pages other than the current page.

47. A computer program product configured to display a document on a device, the product comprising a non-transitory computer-readable medium, the medium comprising:

code to display a plurality of curved shapes in a nested arrangement defined by a spiral, each of the curved shapes associated with a portion of the document, wherein the spiral comprises a logarithmic spiral with a growth factor substantially equal to φ, which is the golden ratio;

code to store a current page of the document;

code to receive a rotational motion input, the rotational motion input comprising a circular motion received on a touch-screen display of the device while maintaining a physical orientation of the device;

code to navigate to a selected page in the document based on at least an end point of the rotational motion input; and code to update the current page of the document to the selected page.

\* \* \* \* \*